(12) United States Patent
Kendrick et al.

(10) Patent No.: US 9,653,731 B2
(45) Date of Patent: May 16, 2017

(54) LAYERED OXIDE MATERIALS FOR BATTERIES

(71) Applicant: Sharp Kabushiki Kaisha, Osaka (JP)

(72) Inventors: Emma Kendrick, North Warnborough (GB); Robert Gruar, Swindon (GB)

(73) Assignee: Sharp Kabushiki Kaisha, Osaka (JP)

(*) Notice: Subject to any disclaimer, the term of this patent is extended or adjusted under 35 U.S.C. 154(b) by 133 days.

(21) Appl. No.: 14/580,305

(22) Filed: Dec. 23, 2014

(65) Prior Publication Data

US 2016/0181607 A1    Jun. 23, 2016

(51) Int. Cl.
| | |
|---|---|
| H01M 4/525 | (2010.01) |
| H01M 4/505 | (2010.01) |
| C01G 49/00 | (2006.01) |
| C01G 51/00 | (2006.01) |
| C01G 53/00 | (2006.01) |
| H01M 10/054 | (2010.01) |

(52) U.S. Cl.
CPC ........ *H01M 4/525* (2013.01); *C01G 49/0072* (2013.01); *C01G 51/50* (2013.01); *C01G 53/50* (2013.01); *H01M 4/505* (2013.01); *C01P 2002/72* (2013.01); *C01P 2002/88* (2013.01); *C01P 2006/32* (2013.01); *C01P 2006/40* (2013.01); *H01M 10/054* (2013.01)

(58) Field of Classification Search
None
See application file for complete search history.

(56) References Cited

U.S. PATENT DOCUMENTS

| | | | |
|---|---|---|---|
| 8,709,655 B2 | 4/2014 | Okada et al. | |
| 8,835,041 B2 | 9/2014 | Johnson | |
| 2003/0215715 A1* | 11/2003 | Barker | C01B 25/37 429/232 |
| 2007/0218361 A1 | 9/2007 | Inoue | |
| 2009/0159838 A1 | 6/2009 | Okada et al. | |
| 2011/0003192 A1 | 1/2011 | Kuze et al. | |
| 2011/0244332 A1 | 10/2011 | Saito | |
| 2012/0015230 A1* | 1/2012 | Kuze | C01G 45/1228 429/144 |
| 2012/0082897 A1* | 4/2012 | Saito | H01M 4/131 429/224 |
| 2013/0146808 A1* | 6/2013 | Endo | H01M 4/505 252/182.1 |
| 2015/0037679 A1 | 2/2015 | Barker et al. | |
| 2015/0243983 A1* | 8/2015 | Barker | C01G 53/40 429/223 |
| 2015/0357641 A1* | 12/2015 | Sugie | H01M 4/505 429/223 |

FOREIGN PATENT DOCUMENTS

| | | |
|---|---|---|
| GB | 2506859 A | 4/2014 |
| JP | 2006-179473 A | 7/2006 |
| JP | 2010 129509 | 6/2010 |
| JP | 5085032 B2 | 11/2012 |
| JP | 2012-252962 A | 12/2012 |
| JP | 2015 118898 | 6/2015 |
| WO | WO 2006/057307 A1 | 6/2006 |
| WO | WO 2009/099061 A1 | 8/2009 |
| WO | WO 2013/140174 A2 | 9/2013 |
| WO | WO 2015/177568 | 11/2015 |

OTHER PUBLICATIONS

Ono et al., "Thermoelectric properties of Ca-doped $\gamma$-$Na_xCoO_2$," Transactions of the Materials Research Society of Japan, Sep. 2004, vol. 29, No. 6, p. 2821-2824 (2004).
H. Schettler, "Investigation of solid sodium reference electrodes for solid-state electrochemical gas sensors", Applied Physics A, 1993, vol. 57, Issue 1, pp. 31-35.
Komaba, S. et al., Electrochemical Na insertion and solid electrolyte interphase for hard-carbon electrodes and application to Na-ion batteries, Adv. Funct. Mater. 21, 3859-3867(2011).

* cited by examiner

*Primary Examiner* — Mark Kopec
*Assistant Examiner* — Katie L Hammer
(74) *Attorney, Agent, or Firm* — Renner, Otto, Boisselle & Sklar, LLP

(57) ABSTRACT

Materials are presented of the formula:

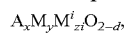

where A is sodium or a mixed alkali metal including sodium as a major constituent;
  $x > 0.5$;
  M is a transition metal;
  $y > 0$;
  $M^i$, for $i = 1, 2, 3 \ldots n$, is a metal or germanium;
  $z_1 > 0$
  $z_i \geq 0$ for each $i = 2, 3 \ldots n$;
  $0 < d \leq 0.5$;
the values of x, y, $z_i$ and d are such as to maintain charge neutrality; and the values of y, $z_i$ and d are such that $y + \Sigma z_i > \frac{1}{2}(2-d)$. The formula includes compounds that are oxygen deficient. Further the oxidation states may or may not be integers i.e. they may be whole numbers or fractions or a combination of whole numbers and fractions and may be averaged over different crystallographic sites in the material. Such materials are useful, for example, as electrode materials in rechargeable battery applications.

20 Claims, 34 Drawing Sheets

LAYERED OXIDE MATERIALS FOR BATTERIES

TECHNICAL FIELD

The present invention related to electrodes that contain an active material comprising Layered oxide materials which show novel anion stoichiometry, and to the use of such electrodes, for example in a sodium ion battery application. The invention is also related to certain novel materials and to the use of these materials for example as an electrode material.

BACKGROUND ART

The lithium-ion rechargeable battery technology has received a lot of attention in recent years and is used in most electronic devices today. Lithium is not a cheap or abundant metal and it is considered to be too expensive to some markets requiring rechargeable battery technologies; such as large scale stationary energy storage applications. Sodium-ion batteries are similar to lithium ion batteries, both are rechargeable and comprise an anode (negative electrode), a cathode (positive electrode) and an electrolyte material, both are capable of storing energy, and they both charge and discharge via a similar reaction mechanism. When a sodium-ion (or lithium-ion battery) is charging, $Na^+$ (or $Li^+$) ions de-intercalate from the cathode and insert into the anode. Concurrently charge balancing electrons pass from the cathode through an external circuit containing the charger and into the anode of the battery. During discharge the same process occurs but in the opposite direction.

Sodium ion battery technology is considered to offer certain advantages over lithium. Sodium is more abundant than lithium and some researchers think that this will offer a solution for a low cost and durable energy storage requirement, particularly for large scale applications such as grid level energy storage. Nevertheless a significant amount of development is required before sodium-ion batteries are a commercial reality.

There are a number of material types which have been shown to be useful in rechargeable sodium ion batteries which include; Metallate materials, Layered oxide materials, polyanionic compounds, phosphates and silicates. However, one of the most attractive classes of material is that of the layered oxides.

A well-known layered oxide material has the formula $NaNi_{0.5}Mn_{0.5}O_2$. In this material the transition metal nickel is present as $Ni^{2+}$ while the manganese is present as $Mn^{4+}$. This is an ordered material with the Na and Ni atoms residing in discrete sites within the structure. In this case the nickel ions ($Ni^{2+}$) are a redox active element which contributes to the reversible specific capacity and the manganese ions ($Mn^{4+}$) play the role of a structure stabilizer. Similarly, the compound $NaNi_{0.5}Ti_{0.5}O_2$ is analogous to $NaNi_{0.5}Mn_{0.5}O_2$ in that the $Ni^{2+}$ ions provide the active redox centre and the $Ti^{4+}$ ions are present for structure stabilization. There is a considerable quantity of literature describing $NaNi_{0.5}Mn_{0.5}O_2$ and the titanium analogue, as a precursor for the lithium layered oxide material $LiNi_{0.5}Mn_{0.5}O_2$ and $NaNi_{0.5}Ti_{0.5}O_2$ and the subsequent ion exchanging the sodium for lithium. However, recent electrochemical studies reported by Komaba et al Adv. Funct. Mater. 2011, 21, 3859 describe the sodium insertion performance of hard-carbon and layered $NaNi_{0.5}Mn_{0.5}O_2$ electrodes in propylene carbonate electrolyte solutions. The results obtained show that $NaNi_{0.5}Mn_{0.5}O_2$ exhibits some reversible charging and discharging ability, unfortunately however the capacity of the material fades by 25% or more, after only 40 cycles which makes the use of this material extremely disadvantageous for rechargeable energy storage applications. As such there is significant interest in improving the electrochemical performance of such materials.

This invention discloses an oxygen non-stoichiometric material compositions based on a layered oxide framework. Herein, we define oxygen non-stoichiometry as deviation from the $ABO_2$ formula of the layered oxide framework, wherein in a pristine material the ratio of elements is 1:1:2. Within this invention we claim that the ratio deviates from the ideal $ABO_2$ stoichiometry in the following manner $ABO_{2-\delta}$ wherein, the average oxidation state of one or more elements contained within the B site reduces to rebalance the structures charge and retain charge neutrality whilst the proportion of elements on the B site remains unchanged.

This yields the same atomic ratios within the A and B site only with variation on the O site. So the relative proportions of elements within the material can be expressed as $1:1:2_{-\delta}$ and the average oxidation state of each site can be expressed as $+1:+3_{-2/\delta}:-4_{-\delta}$ Most of the background literature for these types of materials is based upon stoichiometric sodium transition metal oxides which adopt either a P2 or O3 layered structure. This invention describes novel compositions based on the sodium layered oxides for application in a sodium ion battery. Within this material class there is substantial prior art based on material composition, focused on the Na content and ratios of transition metal elements.

For example, US20070218361 A1 describes a material suitable for a sodium ion battery and claim a positive electrode based on a sodium-containing transition metal oxide. The compositions of the oxide is described as $Na_aLi_bMn_xMy0_{2\pm c}$, where, M may include at least one selected from the group consisting of iron, cobalt, and nickel, a is in the range 0.6 to 1.1 and b may range from 0 to 0.5, the sum of x and y may range from 0.9 to 1.1, and c may be from 0 to 0.1. In this application it is claimed that the number of oxygen atoms in the materials formula unit is based on charge compensation of the structure. In this compositional claim the O content is linked to the Na/Li content of the material and cannot be deficient i.e. there cannot be fewer oxygen atoms in the material than the sum of alkali and transition metals.

Similarly, in U.S. Pat. No. 8,835,041B2 a layered oxide material suitable for application in an energy storage device is defined. The compositional claims of this patent are described by the formula $Na_cLi_dNi_eMn_fM_z0_b$, wherein M comprises one or more metal cations, and the ratios of constituents are limited to $0.24<c/b=<0.5$, $0<d/b=<0.23$, $0=<e/b=<0.45$, $0=<f/b=<0.45$, $0=<z/b=<0.45$, the combined average oxidation state of the metal components is in the range of about 3.9 to 5.2, and b is equal to $(c+d+Ve+Xf+Yz)/2$, wherein V is the average oxidation state of the Ni, X is the average oxidation state of the Mn, and Y is the average oxidation state of the M in the material. M may be selected from Mg2+, Co2+, Co3+, B3+, Fe2+, Fe3+, Ga3+, Al3+, and Ti4+.

Further to these disclosures, JP2012252962A claims a positive electrode for a secondary battery, expressed by the formula $Li_aA_bM_cO_d$, where A represents one or more elements selected from the group consisting of Na and K, M represents one or more transition metal elements, $0<a\le1.5$, $0\le b<1.5$, $0<c\le3$, $0<d\le6$, and $0<a+b\le1.5$. The patent refers to these materials adopting a spinel type structure rather than a layered oxide structure.

Further to these documents,

U.S. Pat. No. 8,709,655B2, JP5085032B2, US20090159838A1, WO2006/057307, JP2006179473A, US20110003192A1, and WO2009/099061 detail the application of sodium layered oxides for application in energy storage devices The compositional claims of these documents limit the content of oxygen in the material to O2 and they do not contain any oxygen non stoichiometry.

SUMMARY OF INVENTION

To the accomplishment of the foregoing and related ends, the invention, comprises the features hereinafter fully described and identified in the claims. The following description and the annexed drawings set forth detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

A first aspect of the invention provides a composition having the formula $$A_x M_y M^i{}_{zi} O_{2-d},$$

where:

A is sodium or a mixed alkali metal including sodium as a major constituent;

$x > 0.5$;

M is a transition metal;

$y > 0$;

$M^i$, for $i = 1, 2, 3 \ldots n$, is a metal or germanium;

$z_1 > 0$;

$z_i \geq 0$ for each $i = 2, 3 \ldots n$;

$0 < d \leq 0.5$;

the values of x, y, $z_i$ and d are such as to maintain charge neutrality; and the values of y, $z_i$ and d are such that $y + \Sigma z_i > \frac{1}{2}(2-d)$.

The present invention provides new compositions that display oxygen non-stoichiometry. The concept of oxygen non-stoichiometry will be briefly explained with regard to the composition $ABO_2$ in which element(s) A occupy one site and has an oxidation state of +1 and in which element(s) B occupy another site and has an oxidation state of +3. In an ideal (stoichiometric) material, the ratio of elements is A:B:O=1:1:2, and the oxygen has an oxidation state of −2 giving charge neutrality.

The ratio of elements may deviate from the ideal $ABO_2$ stoichiometry to give a composition with the non-stoichiometric formula $ABO_{2-\delta}$, with the average oxidation state of one or more elements contained within the B site being less than 3 to retain charge neutrality. However, the proportion of elements on the B site does not change, and there is variation only on the O site. So the relative proportions of elements within the material can be expressed as $1:1:(2-\delta)$ and the composition may be thought of as "oxygen deficient" in that the oxygen content of $(2-\delta)$ is below the "ideal" value of 2. In a similar manner, it is in principle possible to obtain an "oxygen rich" composition with the formula $ABO_{2+\delta}$ with the average oxidation state of one or more elements contained within the B site being above 3 to retain charge neutrality.

The term "transition metal" as used herein includes the f-block lanthanides and actinides (sometimes referred to as the "inner transition metals") as well as groups 3 to 12 of the periodic table.

The composition may adopt a layered oxide structure in which the alkali metal atoms are co-ordinated by oxygen in a prismatic environment, or it may adopt a layered oxide structure in which the alkali metal atoms are co-ordinated by oxygen in an octahedral environment.

The values of x, y, $z_i$ and d may be such that $x + y + \Sigma z_i > 2 - d$.

$M^i$, for $i = 1, 2, 3 \ldots n$, may be a transition metal, an alkali metal or an alkaline earth metal.

$M^i$, for $i = 1, 2, 3 \ldots n$, may be selected from the group consisting of: nickel, iron, cobalt, manganese, titanium, aluminium, magnesium and zirconium. However, the invention is not limited to this and $M^i$ may alternatively be selected from the group consisting of: sodium, lithium, potassium, nickel, iron, cobalt, manganese, titanium, vanadium, niobium, tantalum, hafnium, chromium, molybdenum, tungsten, osmium, palladium, platinum, copper, silver, gold, zinc, cadmium, aluminium, scandium, yttrium, zirconium, technetium, rhenium, ruthenium, rhodium, iridium, mercury, gallium, indium, lead, bismuth, selenium, magnesium, calcium, beryllium, strontium, barium, boron, germanium, arsenic, antimony and tellurium.

Optionally $0.5 \leq a \leq 0.67$. Examples of such compositions include $Na_{0.67} Ni_{0.3333} Mn_{0.6666} O_{2-d}$
$Na_{0.67} Ni_{0.3333} Mn_{0.6666-x} Ti_x O_{2-d}$
$Na_{0.67} Ni_{0.3333} Mn_{0.6666-x} Zr_x O_{2-d}$
$Na_{0.67} Ni_{0.3333-x/2} Mn_{0.6666-x/2} Fe_x O_{2-d}$
$Na_{0.67} Ni_{0.3333-x/2} Mn_{0.6666-x/2} Co_x O_{2-d}$
$Na_{0.67} Ni_{0.3333-x/2} Mn_{0.6666-x/2} Al_x O_{2-d}$
$Na_{0.67} Ni_{0.3333-x/2} Ti_{0.6666-x/2} Fe_x O_{2-d}$
$Na_{0.67} Ni_{0.3333-x/2} Ti_{0.6666-x/2} Co_x O_{2-d}$
$Na_{0.67} Ni_{0.3333-x/2} Ti_{0.6666-x/2} Al_x O_{2-d}$
$Na_{0.67} Ni_{0.3333-x/2} Ti_{0.6666-y-(x/2)} Mn_y Co_x O_{2-d}$
$Na_{0.67} Ni_{0.3333-x/2} Ti_{0.6666-y-(x/2)} Mn_y Fe_x O_{2-d}$
$Na_{0.67} Ni_{0.3333-x/2} Ti_{0.6666-y-(x/2)} Mn_y Al_x O_{2-d}$ Optionally $0.67 \leq a \leq 0.76$. Examples of such compositions include $Na_{0.76} Mn_{0.65-(x+y)} Co_y Ni_x O_{2-d}$
$Na_{0.76} Mn_{0.65-(x+y)} Fe_y Ni_x O_{2-d}$
$Na_{0.76} Mn_{0.65-((x-z)+y)} Co_y Ni_{x-z} Mg_z O_{2-d}$
$Na_{0.76} Mn_{0.65-((x-z)+y)} Fe_y Ni_{x-z} Mg_z O_{2-d}$
$Na_{0.76} Mn_{0.65-((X-z)+y)} Co_y Fe_{x-z} Mg_z O_{2-d}$
$Na_{0.76} Ti_{0.65-(x+y)} Co_y Ni_x O_{2-d}$
$Na_{0.76} Ti_{0.65-(x+y)} Fe_y Ni_x O_{2-d}$
$Na_{0.76} Ti_{0.65-((x-z)+y)} Co_y Ni_{x-z} Mg_z O_{2-d}$
$Na_{0.76} Ti_{0.65-((x-z)+y)} Fe_y Ni_{x-z} Mg_z O_{2-d}$
$Na_{0.76} Ti_{0.65-((x-z)+y)} Co_y Fe_{x-z} Mg_z O_{2-d}$
$Na_{0.76} Ti_a Mn_{0.65-a-((x-z)+y)} CO_y Fe_{x-z} Mg_z O_{2-d}$ A second aspect of the invention provides a composition having the formula $$A_x M_y M^1{}_{z1} M^i{}_{zi} O_{2-d},$$

where

A is sodium or a mixed alkali metal including sodium as a major constituent;

$x > 0$;

M is a transition metal;

$y > 0$;

$M^1$ is an alkali metal or a mixed alkali metal;

$z_1 > 0$;

$M^i$, for $i = 2, 3, 4 \ldots n$, is a metal or germanium;

$z_2 > 0$;

$z_i \geq 0$ for each $i = 3, 4 \ldots n$;

$0 < d \leq 0.5$;

the values of x, y, $z_i$ and d are such as to maintain charge neutrality;

the values of y, $z_i$ and d are such that $y+\Sigma z_i>\frac{1}{2}(2-d)$; and the composition adopts a layered oxide structure in which the alkali metal atoms A are co-ordinated by oxygen in a prismatic or octahedral environment, and in which the alkali metal atoms $M^1$ adopts a co-ordination complementary to that adopted by the other Mi transition metal element(s).

In general these materials have a structure with only one transition metal site, unless there is ordering. It is believed that the further alkali metal (or mixed alkali metal) atoms $M^1$ occupy the transition metal site together with the transition metal atoms M and the additional metal constituent $M^2$ (and any other further constituent $M^i$ that might be present), and so adopt a co-ordination that is complementary to the other metal constituents present. The sodium (or mixed alkali metal including sodium as a major constituent) atoms A are believed to occupy the alkali metal site in the material structure.

In a composition of this aspect, the further alkali metal constituent $M^1$ may be the same as the first alkali metal constituent A (for example, Na $Na_{0.167}$ $Ni_{0.25}Mn_{0.5833}$ $O_{2-d}$ (or Na $Na_{1/6}Mn_{7/12-x}Ti_xO_{2-d}$)) or it may be different to the first alkali metal constituent A (for example $NaLi_{0.2}Ni_{0.25}Mn_{0.55}O_{2-d}$). Accordingly, some compositions according to this aspect may be written with formulae of the type "Na $Na_{0.167}$ $Ni_{0.25}Mn_{0.5833}O_{2-d}$", in which an alkali metal (in this example sodium) is written twice to indicate that ions are on two distinct sites in the material structure. In this example the first occurrence ("Na") denotes sodium ions occupying the alkali metal site of the material structure, and the second occurrence ("$Na_{0.167}$") denotes sodium ions believed to occupy the transition metal site of the material structure.

It should also be noted that some compositions according to this aspect may have formulae of the type "Na $Na_{0.167-y}$ $Li_y$ $Ni_{0.25}Mn_{0.5833}O_{2-d}$". In such a composition the "$Na_{0.167-y}Li_y$" denotes a mixed alkali metal that occupies the transition metal site, and the initial "Na" again denotes sodium ions occupying the alkali metal site.

The values of x, y, $z_i$ and d may be such that $x+y+\Sigma z_i>2-d$.

$M^i$, for i=3, 4 ... n, may be a transition metal, an alkali metal or an alkaline earth metal.

$M^1$ may be selected from the group consisting of: sodium, lithium, and a mixture of sodium and lithium.

$M^i$, for i=2, 3 ... n, may be selected from the group consisting of: nickel, iron, cobalt, manganese, titanium, aluminium, magnesium and zirconium. However, the invention is not limited to this and $M^i$ may alternatively be selected from the group consisting of: sodium, lithium, potassium, nickel, iron, cobalt, manganese, titanium, vanadium, niobium, tantalum, hafnium, chromium, molybdenum, tungsten, osmium, palladium, platinum, copper, silver, gold, zinc, cadmium, aluminium, scandium, yttrium, zirconium, technetium, rhenium, ruthenium, rhodium, iridium, mercury, gallium, indium, lead, bismuth, selenium, magnesium, calcium, beryllium, strontium, barium, boron, germanium, arsenic, antimony and tellurium.

Optionally $0.9 \leq x$.

Optionally $x \leq 1.3$.

Optionally $z_2 \leq 0.3$.

$NaLi_{0.2}Ni_{0.25}Mn_{0.55}O_{2-d}$ $NaLi_{0.2}Ni_{0.25}Mn_{0.55-x}Ti_xO_{2-d}$ $NaLi_{0.2}Ni_{0.25-x/2}Mn_{0.55-x/2}Fe_xO_{2-d}$ $NaLi_{0.2}Ni_{0.25-x/2}Mn_{0.55-x/2}Co_xO_{2-d}$ $NaLi_{0.2}Ni_{0.25-x/2}Mn_{0.55-x/2}Al_xO_{2-d}$ $NaLi_{0.2}Ni_{0.25-x}Mn_{0.55-y-(x/2)}Ti_{y-x/2}Fe_xO_{2-d}$ $NaLi_{0.2}Ni_{0.25-x}Mn_{0.55-y-(x/2)}Ti_{y-x/2}Co_xO_{2-d}$ $NaLi_{0.2}Ni_{0.25-x}Mn_{0.55-y-(x/2)}Ti_{y-x/2}Al_xO_{2-d}$ $Na_{0.9}Li_{0.3}Ni_{0.25}Mn_{0.55}O_{2-d}$ $Na_{0.9}Li_{0.3}Ni_{0.25}Mn_{0.55-x}Ti_xO_{2-d}$ $Na_{0.9}Li_{0.3}Ni_{0.25-x}Mn_{0.55-x}Fe_xO_{2-d}$ $Na_{0.9}Li_{0.3}Ni_{0.25-x}Mn_{0.55-x}Co_xO_{2-d}$ $Na_{0.9}Li_{0.3}Ni_{0.25-x}Mn_{0.55-x}Al_xO_{2-d}$ $Na_{0.9}Li_{0.3}Ni_{0.25-x}Mn_{0.55-y-(x/2)}Ti_{y-x/2}Fe_xO_{2-d}$ $Na_{0.9}Li_{0.3}Ni_{0.25-x}Mn_{0.55-y-(x/2)}Ti_{y-x/2}Co_xO_{2-d}$ $Na_{0.9}Li_{0.3}Ni_{0.25-x}Mn_{0.55-y-(x/2)}Ti_{y-x/2}Al_xO_{2-d}$

Na $Na_{0.167}$ $Ni_{0.25}Mn_{0.5833}O_{2-d}$

Na $Na_{0.167}$ $Ni_{0.25}Mn_{0.5833-x}Ti_xO_{2-d}$

Na $Na_{0.167}$ $Ni_{0.25}Mn_{0.5833-x}Zr_xO_{2-d}$

Na $Na_{0.167-y}$ $Li_y$ $Ni_{0.25}Mn_{0.5833}O_{2-d}$

Na $Na_{0.167-y}$ $Li_y$ $Ni_{0.25}Mn_{0.5833}Ti_xO_{2-d}$

Na $Na_{0.167-y}$ $Li_y$ $Ni_{0.25}Mn_{0.5833}Zr_xO_{2-d}$

Na $Na_{0.167-y}$ $Li_y$ $Ni_{0.25-x/2}Mn_{0.5833-x/2}Fe_xO_{2-d}$

Na $Na_{0.167-y}$ $Li_y$ $Ni_{0.25-x/2}Mn_{0.5833-x/2}Co_xO_{2-d}$

Na $Na_{0.167-y}$ $Li_y$ $Ni_{0.25-x/2}Mn_{0.5833-x/2}Al_xO_{2-d}$

It should be noted that in compositions such as $Na_{0.9}Li_{0.3}Ni_{0.25}Mn_{0.55}O_{2-d}$ above, some of the Li atoms form a mixed alkali metal with the Na atoms which is believed to occupy the alkali metal site, and some of the Li atoms are the further alkali metal constituent $M^1$. This composition may therefore alternatively be thought of as: $(Na_{0.9}Li_{0.1})Li_{0.2}Ni_{0.25}Mn_{0.55}O_{2-d}$, and similarly for the other compositions of this type.

A third aspect of the invention provides a composition having the formula $$A_xM_yM^i{}_{z_i}O_{2-d},$$

where

A is an sodium or a mixed alkali metal including sodium as a major constituent;

$x>0$;

M is a transition metal not including nickel;

$y>0$;

$M^i$, for i=1, 2, 3 ... n, is germanium or a metal not including nickel;

$z_i \geq 0$ for each i=1, 2, 3 ... n;

$0<d \leq 0.5$; and the values of x, y, $z_i$ and d are such as to maintain charge neutrality.

The values of y, $z_i$ and d may be such that $y+\Sigma z_i>\frac{1}{2}(2-d)$

The values of x, y, $z_i$ and d may be such that $x+y+\Sigma z_i>2-d$.

$M^i$, for i=1, 2, 3 ... n, may be selected from the group consisting of: iron, cobalt, manganese, titanium, aluminium, magnesium, calcium and zirconium. However, the invention is not limited to this and $M^i$ may alternatively be selected from the group consisting of: sodium, lithium, potassium, nickel, iron, cobalt, manganese, titanium, vanadium, niobium, tantalum, hafnium, chromium, molybdenum, tungsten, osmium, palladium, platinum, copper, silver, gold, zinc, cadmium, aluminium, scandium, yttrium, zirconium, technetium, rhenium, ruthenium, rhodium, iridium, mercury, gallium, indium, lead, bismuth, selenium, magnesium, calcium, beryllium, strontium, barium, boron, germanium, arsenic, antimony and tellurium.

Examples of compositions according to this aspect include compositions assuming Co is in a +3 oxidation state, and having the formula:

$$NaMg_xMn_yCo_{1-(x+y)}O_{2-\delta} \text{(where } x=y\text{)}.$$

Other compositions according to this aspect include compositions assuming Fe is in a +3 oxidation state, and having the formula:

$$NaMg_xMn_yFe_{1-(x+y)}O_{2-\delta} \text{(where } x=y\text{)}.$$

A fourth aspect of the invention provides an electrode comprising composition according to one of the first to third aspects. The composition may form an active element of the electrode. An electrode of this aspect may be used in conjunction with a counter electrode and one or more electrolyte materials. The electrolyte material may comprise an aqueous electrolyte material, or it may comprise a non-aqueous electrolyte.

A fifth aspect of the invention provides an energy storage device comprising an electrode of the fourth aspect.

The energy storage device may be suitable for use as one or more of the following: a sodium and/or potassium ion cell; a sodium and/or potassium metal cell; a non-aqueous electrolyte sodium and/or potassium ion cell; and an aqueous electrolyte sodium and/or lithium and/or potassium ion cell.

A sixth aspect of the invention provides a rechargeable battery comprising at least one of an electrode of the fourth aspect and an energy storage device of the fifth aspect.

A seventh aspect of the invention provides an electrochemical device comprising at least one of an electrode of the fourth aspect and an energy storage device of the fifth aspect.

A eighth aspect of the invention provides an electrochromic device comprising at least one of an electrode of the fourth aspect and an energy storage device of the fifth aspect.

A ninth aspect of the invention provides an oxide ion conductor comprising a material having a composition according to one of the first to third aspects.

A composition of the invention may be prepared by mixing starting materials together, heating the mixed starting materials at a temperature of between 400° C. and 1500° C., to obtain an oxygen-deficient reaction product, and cooling the reaction product, or allowing the reaction product to cool, under conditions that prevent significant re-incorporation of oxygen into the oxygen-deficient reaction product.

Since the reaction product is cooled, or allowed to cool, under conditions that prevent significant re-incorporation of oxygen into the oxygen-deficient reaction product, the end product is an oxygen deficient composition having the formula $A_x M_y M'_z O_{2-d}$. (It should be noted that some slight re-incorporation of oxygen may occur, so that the oxygen fraction 2−d of the end product may not be exactly equal to the oxygen fraction of the oxygen-deficient reaction product obtained by heating the starting materials.)

The present invention can provides a bulk material with an oxygen deficient composition. In contrast to some prior techniques can only provide mild levels of reduction (that is, mild levels of oxygen loss) on the surface of the sample, and cannot provide a bulk oxygen deficient material.

The mixed starting materials may be heated for more than 30 seconds and/or may be heated for less than 200 hours, and optionally may be heated for more than 2 hours and/or may be heated for less than 200 hours.

Cooling the reaction product may comprise cooling the reaction product in one of an inert atmosphere and a reducing atmosphere.

Cooling the reaction product may comprise cooling the reaction product in an inert atmosphere, the inert atmosphere being, or consisting substantially of, one or more inert gases. Examples of suitable inert gases include nitrogen, and argon and other of the noble gases.

Alternatively, cooling the reaction product may comprise cooling the reaction product in a reducing atmosphere such as, for example, an atmosphere of hydrogen in nitrogen.

However, the invention does not require cooling the reaction product in a reducing atmosphere, and requires only that the cooling is carried out under conditions that prevent significant re-incorporation of oxygen.

Heating the mixed starting materials to obtain an oxygen-deficient reaction product may comprise heating the mixed starting materials in an oxidising atmosphere.

Heating the mixed starting materials to obtain an oxygen-deficient reaction product may comprise heating the mixed starting materials in air.

As set out above, the present invention provides compounds of the formula:

$$A_u M_{1v} O_{2-d}$$

Wherein,

A comprises one or more alkali metals or combination thereof (lithium, sodium and potassium)

$M_1$ can be a transition metal or mixture thereof in suitable proportions to maintain charge neutrality in the composition and may consist of metals in oxidation states of +1, +2, +3 or +4 in any ratio or combination.

U may range from $0.5<U<2$

V may range from $0.25<V<1.5$;

$$0<d<0.5$$

The above formula includes compounds that are oxygen deficient. Further the oxidation states may or may not be integers i.e. they may be whole numbers or fractions or a combination of whole numbers and fractions and may be averaged over different crystallographic sites in the material.

The present Applicant has found that not only are the oxidation states of the metal constituents in the compounds of the present invention a critical feature to the production of highly electrochemically active compounds but they have also confirmed that having particular transition metal constituents allows variable oxidation states (i.e. oxidation states which are not integers) in the same crystalline structure of the compound. It is known that that there are several possible layered structural forms which alkali metal/metal/oxides may adopt, including O3, P3 and P2. The Applicant has shown that the oxidation states for the metal constituents can allow oxidation states which are not integers to be stabilised in many structural forms including O3, P3 and P2 via the loss of oxygen from the material. The magnitude of the loss of oxygen may also be controlled by tailoring the synthesis of these materials. The applicant has also noted several notable benefits in the application of these materials in electrochemical devices. Materials which show oxygen deficiency generally show lower irreversibility on alkali metal intercalation and de intercalation, they also show similar capacity retention and similar intercalation potentials. The slightly lower oxygen content also results in dilation of the unit cell and realises a smaller volume change on electrochemical cycling, leading to improvements in cell lifetime.

Preferred compounds of the present invention include:
e.g. $Na_{0.67}Ni_{0.333}Mn_{0.666}O_{2-d}$
$Na_{0.76}Mn_{0.65}Co_{0.18}Ni_{0.17}O_{2-d}$
$NaLi_{0.2}Ni_{0.25}Mn_{0.75}O_{2-d}$
$Na_{0.9}Li_{0.3}Ni_{0.25}Mn_{0.75}O_{2-d}$
$NaNi_{0.25}Li_{0.166}Mn_{7/12}O_{2-d}$
$Na\ Ni_{0.25}Na_{0.17}Ti_{7/12}O_2^{-d}$
$Na\ Ni_{0.25}Na_{0.17}Mn_{2/12}Ti_{5/12}O_2^{-d}$
$Na\ Ni_{0.25}Na_{0.17}Mn_{5/12}Ti_{2/12}O_2^{-d}$
$Na_{2/3}Ni_{1/3}Mn_{2/3}O_2^{-d}$
$Na_{0.76}Mn_{0.65}CO_{0.18}Ni_{0.17}O_2^{-d}$ The magnitude of d can be controlled.

Additionally preferred electrodes of the present invention comprise active compounds defined above in which d>0.01.

It is particularly advantageous if the electrode comprises active compounds in which transition metals of oxidation states +1, +2 and +4 are combined on the metal site.

The presence of oxygen deficiency is particularly advantageous to improve the electrochemical irreversibility on cycling; resulting in the active materials which are capable of being charged and recharged numerous times with a lower drop in capacity on the first electrochemical cycle. The active materials comprising oxygen deficiency are also advantageous because the reduction of Oxygen content does not appear to have any adverse effect on the intercalation potentials of the material, but yields a few percent gain in gravimetric energy density.

Preferred electrodes of the present invention comprise active compounds selected from one or more of:

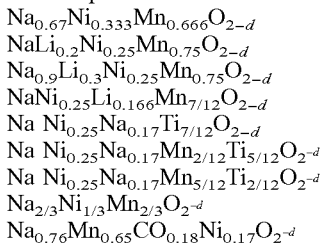

$Na_{0.67}Ni_{0.333}Mn_{0.666}O_{2-d}$
$NaLi_{0.2}Ni_{0.25}Mn_{0.75}O_{2-d}$
$Na_{0.9}Li_{0.3}Ni_{0.25}Mn_{0.75}O_{2-d}$
$NaNi_{0.25}Li_{0.166}Mn_{7/12}O_{2-d}$
$Na\ Ni_{0.25}Na_{0.17}Ti_{7/12}O_{2-d}$
$Na\ Ni_{0.25}Na_{0.17}Mn_{2/12}Ti_{5/12}O_2{}^{-d}$
$Na\ Ni_{0.25}Na_{0.17}Mn_{5/12}Ti_{2/12}O_2{}^{-d}$
$Na_{2/3}Ni_{1/3}Mn_{2/3}O_2{}^{-d}$
$Na_{0.76}Mn_{0.65}Co_{0.18}Ni_{0.17}O_2{}^{-d}$

The electrodes according to the present invention are suitable for use in many different applications, for example energy storage devices, rechargeable batteries, electrochemical devices and electrochromic devices.

Advantageously, the electrodes according to the invention are used in conjunction with a counter electrode and one or more electrolyte materials. The electrolyte materials may be any conventional or known materials and may comprise either aqueous electrolyte(s) or non-aqueous electrolyte(s) or mixtures thereof.

In a further aspect, the present invention provides an energy storage device that utilises an electrode comprising the active materials described above, and particularly an energy storage device for use as one or more of the following: a sodium and/or lithium and/or potassium ion cell; a sodium and/or lithium and/or potassium metal cell; a non-aqueous electrolyte sodium and/or potassium ion; an aqueous electrolyte sodium and/or lithium and/or potassium ion cell.

The novel compounds of the present invention may be prepared using any known and/or convenient method. For example, the precursor materials may be heated in a furnace so as to facilitate a solid state reaction process. They may be further processed at elevated temperatures to induce, reduce or increase the magnitude of oxygen deficiency in the crystal structure.

A particularly advantageous method for the preparation of the compounds described above comprises the steps of:

a) mixing the starting materials together, preferably intimately mixing the starting materials together and further preferably pressing the mixed starting materials into a pellet;

b) heating the mixed starting materials in a furnace at a temperature of between 400° C. and 1500° C., preferably a temperature of between 500° C. and 1200° C., for between 2 and 200 hours. Heating may be undertaken using; a static atmosphere, a flowing gas or a purging gas. Precursor materials may be heated under, oxygen containing atmospheres, reducing atmospheres or inert atmospheres; and c) allowing the reaction product to cool. Cooling may also be undertaken using; a static atmosphere, a flowing gas or a purging gas. Precursor materials may be cooled under, oxygen containing atmospheres, reducing atmospheres or inert atmospheres.

Preferably the reaction is conducted under an atmosphere of ambient air, and alternatively under an inert gas.

DETAILED DESCRIPTION

Figure 1A:
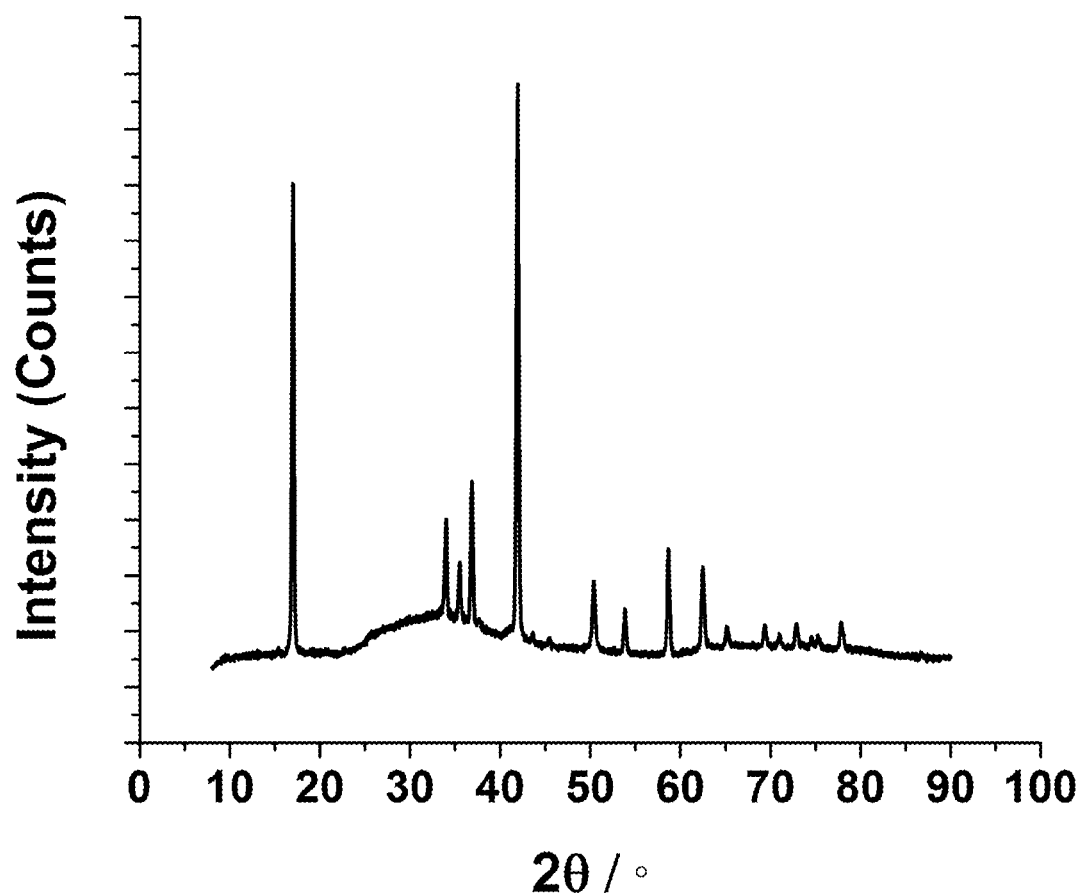
FIG. 1(A) shows Powder X-ray diffraction pattern of $NaNi_{0.25}Na_{0.17}Mn_{4/12}Ti_{3/12}O_2$ prepared according to Example 1.
Figure 1B:
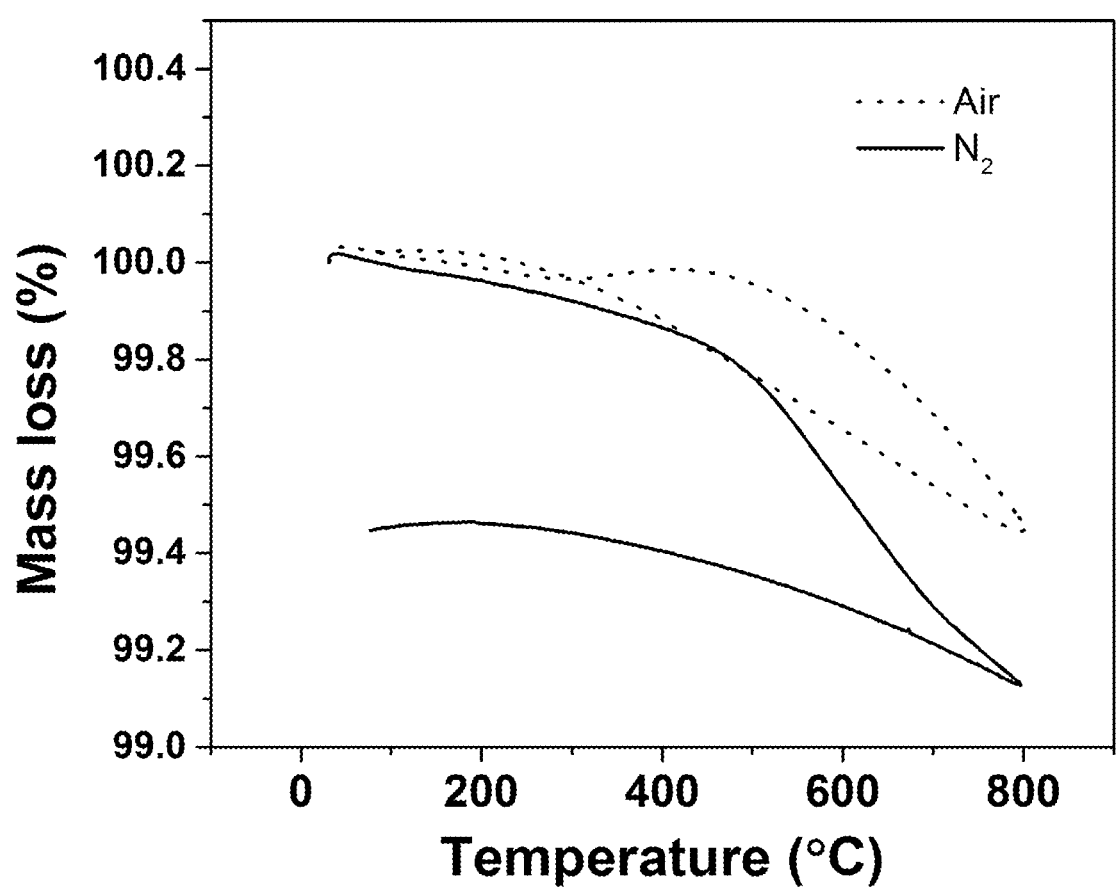
FIG. 1(B) shows the TGA-STA data obtained for $NaNi_{0.25}Na_{0.17}Mn_{4/12}Ti_{3/12}O_2$ (Example 1) heated to a temperature of 800° C. under a constant flow of air (dashed line) or under a constant flow of nitrogen (solid line).
Figure 1C:
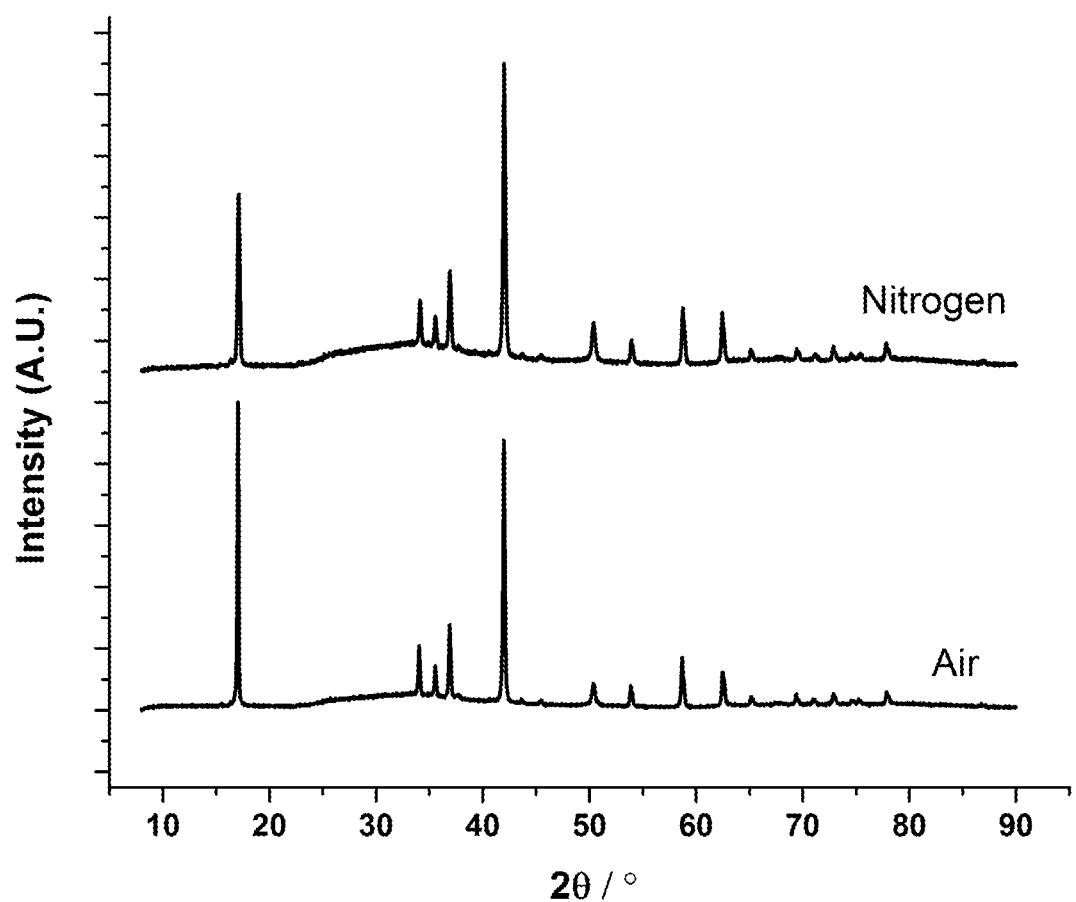
FIG. 1(C) Powder X-ray diffraction patterns of $NaNi_{0.25}Na_{0.17}Mn_{4/12}Ti_{3/12}O_2$ after being heated to 800° C. and cooled in either air or nitrogen.
Figure 1D:
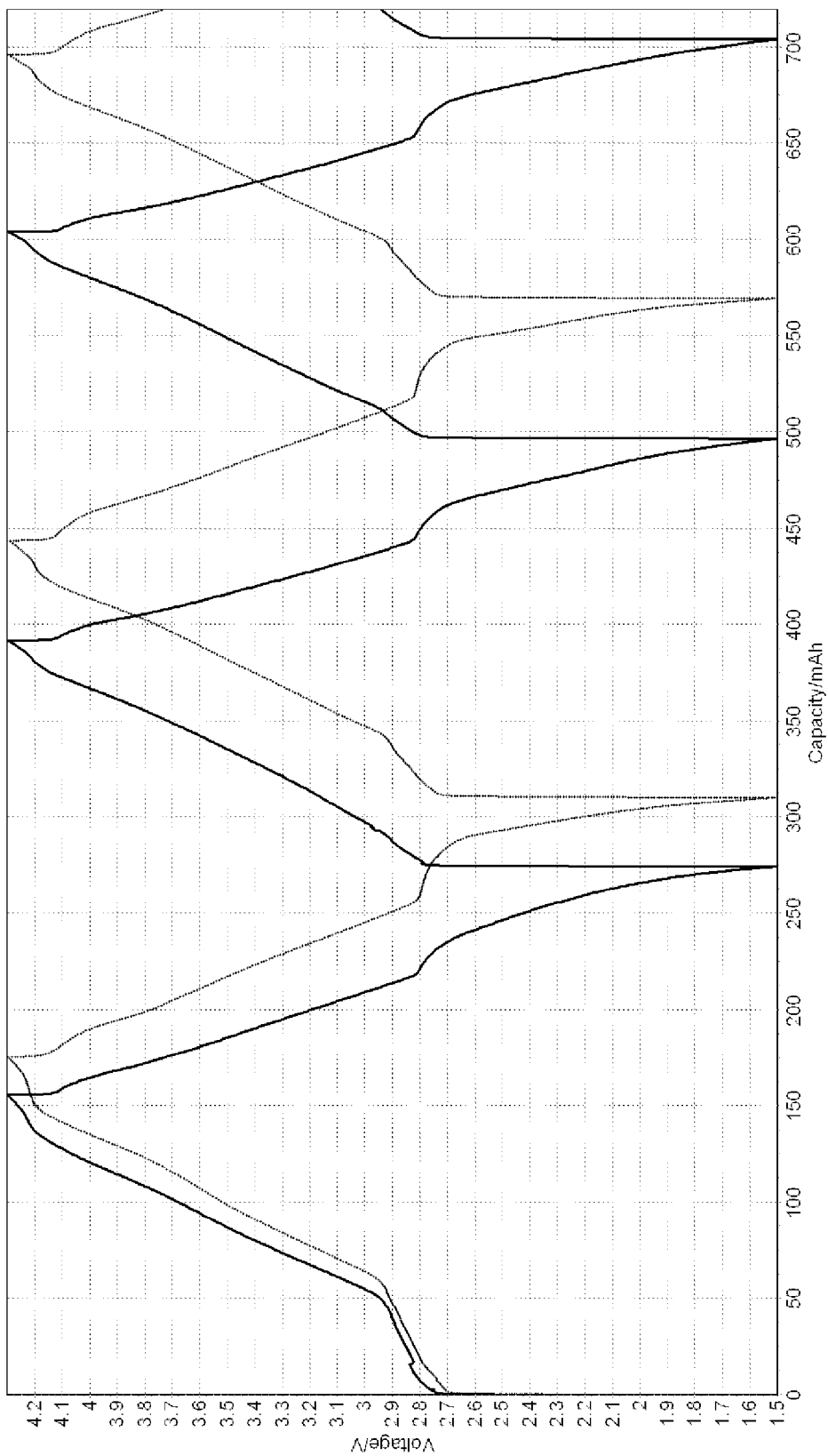
FIG. 1(D) shows the first three charge-discharge voltage profiles (Na-ion half cell Voltage [V vs Na/Na+] verses Cathode specific capacity [mAh/g]) for the cathode material prepared according to Example 1 after heating to 800° C. under a constant flow of air (dashed line) or under a constant flow of nitrogen (solid line).
Figure 1E:
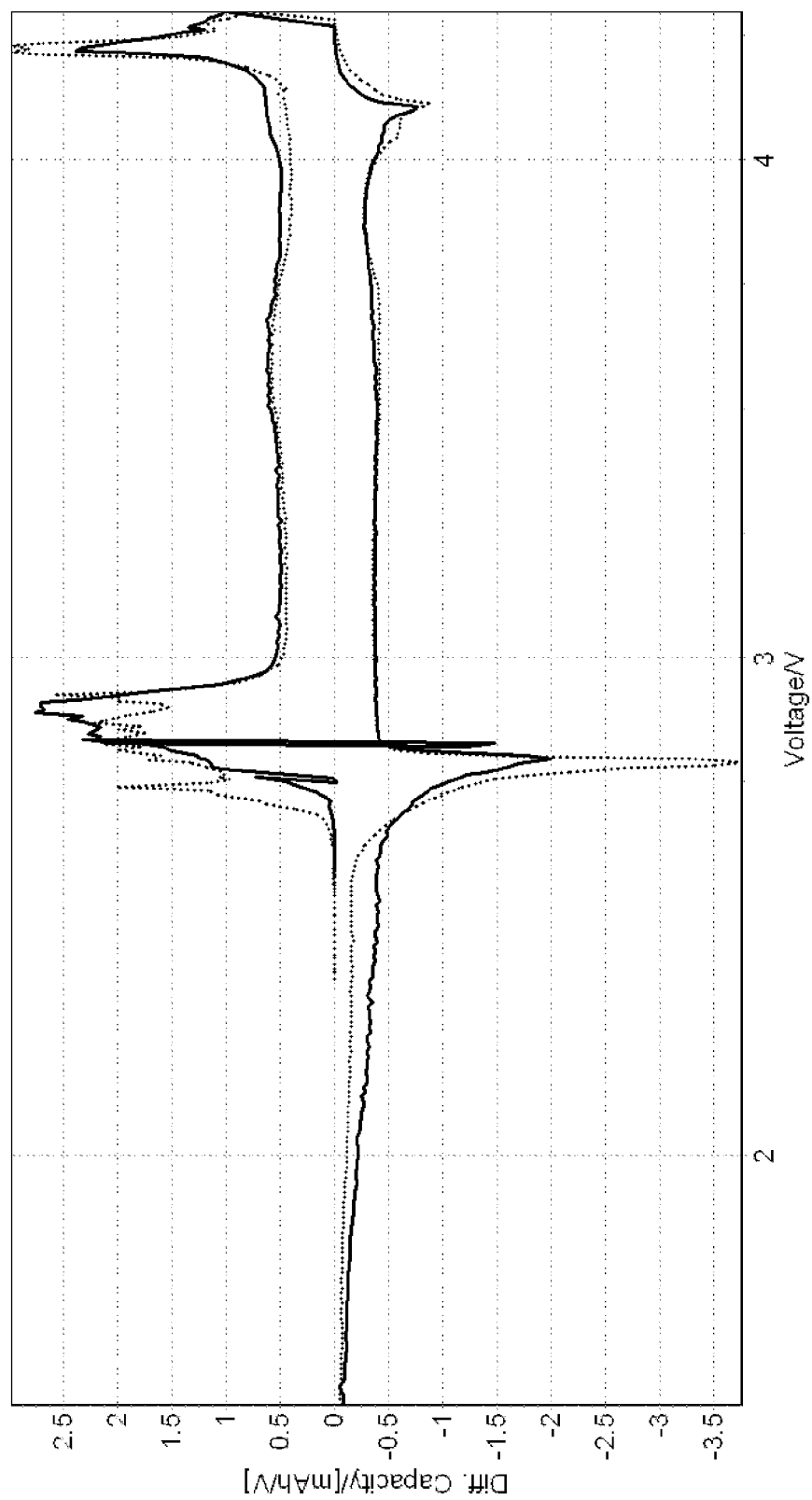
FIG. 1(E) shows the Differential Capacity Profiles for the $1^{st}$ charge cycle (Differential Capacity [mAh/g/V] verses Na-ion half Cell Voltage [V vs Na/Na+]) for the cathode material prepared according to Example 1 heated to a temperature of 800° C. under a constant flow of air (dashed line) or under a constant flow of nitrogen (solid line).

The materials according to the present invention are prepared using the following generic method:

Synthesis Method:

The required amounts of the precursor materials are intimately mixed together and either pressed into a pellet or retained as a free flowing powder. The resulting mixture is then heated in a tube furnace or a chamber furnace using either an ambient air atmosphere, or a flowing inert atmosphere (e.g. argon or nitrogen), at a furnace temperature of between 400° C. and 1500° C. until reaction product forms; for some materials a single heating step is used and for others (as indicated below in Table 1) more than one heating step is used. Different cooling protocols can be used to induce oxygen non-stoichiometry in the materials. Sample may be heated and cooled under different atmospheres as indicated in table 1. When cool, the reaction product is removed from the furnace and ground into a powder prior to characterisation.

Using the above generic method, active materials were prepared, Examples 1 to 11, as summarised below in Table 1:

| Ex. | TARGET COMPOUND | STARTING MATERIALS | FURNACE CONDITIONS |
|---|---|---|---|
| 1 | $NaNi_{0.25}Na_{0.17}Mn_{4/12}Ti_{3/12}O_{2-d}$ | $TiO_2$ $Na_2CO_3$ | (d = 0) = 900° C., 8 h, Air (d > 0) = 800° C., 1 h, $N_2$ |

-continued

| Ex. | TARGET COMPOUND | STARTING MATERIALS | FURNACE CONDITIONS |
|---|---|---|---|
| 2 | $NaNi_{0.25}Na_{0.17}Mn_{2/12}Ti_{5/12}O_{2-d}$ | $NiCO_3$ $MnCO_3$ $TiO_2$ $Na_2CO_3$ | $1^{st}$ firing (d = 0) = 900° C., 8 h, Air $2^{nd}$ firing (d > 0) = 800° C., 1 h, $N_2$ |
| 3 | $NaNi_{0.25}Na_{0.17}Mn_{5/12}Ti_{2/12}O_{2-d}$ | $NiCO_3$ $MnCO_3$ $TiO_2$ $Na_2CO_3$ | $1^{st}$ firing (d = 0) = 900° C., 8 h, Air $2^{nd}$ firing (d > 0) = 800° C., 1 h, $N_2$ |
| 4 | $Na_{2/3}Ni_{1/3}Mn_{2/3}O_{2-d}$ | $NiCO_3$ $MnCO_3$ $Na_2CO_3$ | $1^{st}$ firing (d = 0) = 900° C., 8 h, Air $2^{nd}$ firing (d > 0) = 800° C., 1 h, $N_2$ |
| 5 | $Na_{0.76}Mn_{0.65}Co_{0.18}Ni_{0.17}O_{2-d}$ | $NiCO_3$ $MnCO_3$ $Na_2CO_3$ $TiO_2$ $NiCO_3$ $MnCO_3$ $CoCO_3$ | $1^{st}$ firing (d = 0) = 900° C., 8 h, Air $2^{nd}$ firing (d > 0) = 800° C., 1 h, $N_2$ |
| 6 | $Na\,Fe_{0.5}\,Ti_{0.125}\,Mn_{0.125}Mg_{0.25}O_{2-d}$ | $Na_2CO_3$ $TiO_2$ $MgCO_3$ $MnCO_3$ $Fe_2O_3$ | $1^{st}$ firing (d = 0) = 900° C., 12 h, Air $2^{nd}$ firing (d > 0) = 800° C., 1 h, $N_2$ $Na\,Fe_{0.5}\,Ti_{0.125}\,Mn_{0.125}Mg_{0.25}\,O_{1.98}$ |
| 7 | $Na\,Fe_{0.5}\,Ti_{0.125}\,Mn_{0.125}Mg_{0.25}O_{1.98}$ | | Directly synthesised as d > 0 $1^{st}$ firing 900° C. for 12 h in Air followed by cooling to room temperature under $N_2$ or Argon |
| 8 | $NaNi_{0.5}Ti_{0.5}O_{2-d}$ | $TiO_2$ $Na_2CO_3$ $NiCO_3$ | Directly synthesised as d > 0 $1^{st}$ firing 900° C. for 12 h in Air followed by cooling to room temperature under $N_2$ or Argon |
| 9 | $NaNi_{0.25}Na_{0.17}Mn_{4/12}Ti_{3/12}O_{2-d}$ | $TiO_2$ $Na_2CO_3$ $NiCO_3$ $MnCO_3$ | Directly synthesised as d > 0 $1^{st}$ firing 900° C. for 12 h in Air followed by cooling to room temperature under $N_2$ or Argon |
| 10 | $Na_{2/3}Ni_{1/3}Mn_{2/3}O_{2-d}$ | $Na_2CO_3$ $NiCO_3$ $MnCO_3$ | Directly synthesised as d > 0 $1^{st}$ firing 900° C. for 12 h in Air followed by cooling to room temperature under $N_2$ or Argon |
| 11 | $Na\,Mg_x\,Mn_x\,Co_{1-(x+y)}O_{2-d}$ | $MgCO_3$ $MnCO_3$ $CoCO_3$ $Na_2CO_3$ | Directly synthesised as d > 0 $1^{st}$ firing 900° C. for 12 h in Air followed by cooling to room temperature under $N_2$ or Argon |

One example of a method of manufacturing a composition of the invention is an indirect route in which we first mix the precursors and then fire the mixture to produce a stoichiometric layered oxide. To form the oxygen non-stoichiometric form a secondary processing step is used. The secondary processing step can take one of two forms, the material may be re heated under air to a temperature close to the formation temperature of the material and cooled under a flow of nitrogen. This method relies on preventing the re-uptake of oxygen in the material. A broadly similar method can also be used in which the secondary processing step can be undertake under an inert atmosphere such as an atmosphere consisting, or consisting substantially of, an inert gas or a mixture of inert gases. Examples of suitable inert gases include nitrogen, and argon and the other noble gases. That is, in one example, both the heating and cooling steps can be conducted under a nitrogen atmosphere to yield the non-stoichiometric form of the oxide.

Another example of a method of manufacturing a composition of the invention is a single step process in which we mix the precursor materials together, heat the mixture to an appropriate temperature and holding for a specified time to allow the layered oxide to form. At this stage the layered oxide will be in a metastable state. Simply changing the atmosphere to an inert atmosphere (for example by putting the reaction chamber under a nitrogen atmosphere) at the end of the formation of the material and cooling to room temperature yield the oxygen deficient form of the material without the need for secondary processing.

Generic Procedure to Make a Sodium Metal Electrochemical Test Cell:

Electrochemical cells were prepared using conventional electrochemical testing techniques. Materials were either tested as powder, pressed pellets or as cast electrodes, each testing methodology used is highlighted alongside the example materials. To prepare an electrode of the test material the sample was prepared using a solvent-casting technique, from a slurry containing the active material, conductive carbon, binder and solvent. The conductive carbon used is Super P C65 (Timcal). PVdF (e.g. Kynar) is used as the binder, and NMP (N-Methyl-2-pyrrolidone, Anhydrous, Sigma, UK) is used as the solvent. The slurry is then cast onto an aluminium current collector using the Doctor-blade technique. The electrode is then dried under Vacuum at about 80-120° C. The electrode film contains the following components, expressed in percent by weight: 75% active material, 18% Super P carbon, and 7% Kynar binder. Optionally, this ratio can be varied to optimise the electrode properties such as, adhesion, resistivity and porosity. The electrolyte comprises a 0.5 or 1.0 M solution of $NaClO_4$ in propylene carbonate (PC), and can also be any suitable or known electrolyte or mixture thereof. A glass fibre separator (e.g. Whatman, GF/A) or a porous polypropylene separator (e.g. Celgard 2400) wetted by the electrolyte is interposed between the positive and negative electrodes forming the electrochemical test cell. Typically, cells were symmetrically charged and discharged galvanostatically at a rate of 5-10 mA/g.

The materials described herein can also be tested as powders, where the active material is mixed with a conductive additive, either by hand mixing or in a ball mill. The conductive carbon used is Super P C65 (Timcal). The electro active mixture contains the following components, expressed in percent by weight: 80% active material, 20% Super P carbon, this ratio can be varied to optimise the mixtures properties such as, resistivity and porosity. The electrolyte comprises a 0.5 or 1.0 M solution of $NaClO_4$ in propylene carbonate (PC). A glass fibre separator (e.g. Whatman, GF/A) or a porous polypropylene separator (e.g. Celgard 2400) wetted by the electrolyte is interposed between the positive and negative electrodes forming the electrochemical test cell. Typically, cells were symmetrically charged and discharged galvanostatically at a rate of 5-10 mA/g.

Alternatively, materials described herein may also be tested as pressed pellets, where the active material is mixed with a conductive additive and a polymer binder, either by hand mixing or in a ball mill. The conductive carbon used is Super P C65 (Timcal). The electro active mixture contains the following components, expressed in percent by weight: 80% active material, 10% Super P Carbon, and 10% binder (PVdF or similar), this ratio can be varied to optimise the mixtures properties such as, resistivity, porosity and wetting behaviour of the pellet. The electrolyte comprises a 0.5 or 1.0 M solution of $NaClO_4$ in propylene carbonate (PC). A glass fibre separator (e.g. Whatman, GF/A) or a porous polypropylene separator (e.g. Celgard 2400) wetted by the electrolyte is interposed between the positive and negative electrodes forming the electrochemical test cell. Typically, cells were symmetrically charged and discharged galvanostatically at a rate of 5-10 mA/g.

Cell Testing:

Electrochemical cells of materials prepared according to the procedures outlined in Table 1 were tested using Constant Current Cycling Techniques.

The cell was cycled at a given current density (ca. 5-10 mA/g) between pre-set voltage limits as deemed appropriate for the material under test. A commercial battery cycler from Maccor Inc. (Tulsa, Okla., USA) was used. Cells were charged symmetrically between the upper and lower voltage limits at a constant current density. On charge sodium ions are extracted from the cathode and migrate to the anode. On discharge the reverse process occurs and Sodium ions are re-inserted into the cathode material.

Structural Characterisation:

All of the product materials were analysed by X-ray diffraction techniques using a Bruker D2 phaser powder diffractometer (fitted with a Lynxeye™ detector) to confirm that the desired target materials had been prepared, and also to establish the phase purity of the products and to determine the types of impurities present. From this information it is possible to determine the unit cell lattice parameters.

The operating conditions used to obtain the powder diffraction patterns illustrated, are as follows:

Range: $2\theta=10°-90°$
X-ray Wavelength=1.5418 Å (Angstroms) (Cu Kα)
Step size: $2\theta=0.02$
Speed: 1.5 seconds/step Diffraction patterns were collected using sample holders which could allow measurement of diffraction under an inert atmosphere. The sample holder contributes to the observed diffraction patterns with large peaks centered at ca. $32°=2\theta$ and ca. $50°=2\theta$ and other smooth peak features can also be observed.

Quantification of Oxygen Loss and Uptake:

The loss or uptake of oxygen could be readily quantified using TGA-STA (Thermogravimetric analysis-simultaneous thermal analysis) using a Perkin Elmer STA 6000 equipped with a passivated $Al_2O_3$ crucible. To quantify the oxygen loss or uptake in a layered oxide sample the sample was reheated to a temperature less than or equal to the formation temperature. In a typical experiment the sample was heated at a rate of $20°$ C. $min^{-1}$ to a temperature less than or equal to the formation temperature, the sample was held at temperature for a period in the range 60 s-1 h to allow equilibrium of any metastable state, the sample was cooled at a rate of $20°$ C. $min^{-1}$ to room temperature. The heating and cooling protocol varied by sample as did the combination of flowing gasses and the point at which gas flows were changed. For example, to demonstrate oxygen loss in a stoichiometric sample the sample was heated and cooled under a constant nitrogen flow throughout the entire cycle. Similarly, to demonstrate oxygen uptake in a oxygen deficient sample (Examples 8-12) the sample cycle was completed under a constant flow of air. Control experiments were performed to confirm complete oxygen re-uptake or retention of oxygen deficiency by heating under an inert gas followed by cooling under oxygen or heating under air followed by heating under an inert gas, respectively.

DETAILED DESCRIPTION OF THE INVENTION

Results

The present Applicant has found that not only are the oxidation states of the metal constituents in the compounds of the present invention a critical feature to the production of highly electrochemically active compounds but they have also confirmed that having particular transition metal constituents allows variable oxidation states (i.e. oxidation states which are not integers) in the same crystalline structure of the compound. It is known that that there are several possible layered structural forms which alkali metal/metal/oxides may adopt, including O3, P3 and P2. The Applicant has shown that the oxidation states for the metal constituents can allow oxidation states which are not integers to be stabilised in many structural forms including O2, P3 and P2 via the loss of oxygen from the material. This is achieved through incorporating a reducible transition metal within the material composition. The magnitude of the loss of oxygen may also be controlled by tailoring the synthesis of these materials. The applicant has also noted several benefits in the application of these materials in electrochemical devices. Materials which show oxygen deficiency generally show lower irreversibility on alkali metal intercalation and de intercalation, they also show similar capacity retention and similar intercalation potentials. The slightly lower oxygen content also results in dilation of the unit cell and realises a smaller volume change on electrochemical cycling, leading to improvements in cell capacity retention.

The Invention Will Now be Described with Reference to the Example Materials.

The invention relates to materials which have lost oxygen from their ideal stoichiometry. In the simplest embodiment of the invention oxygen loss may be induced in a stoichiometric layered oxide by post processing. This aspect of the present invention will now be described in reference to examples 1-11.

With reference to Example 1. The data shown in FIG. 1A shows the Powder X-ray diffraction pattern of stoichiometric $NaNi_{0.25}Na_{0.17}Mn_{4/12}Ti_{3/12}O_2$ showing the formation of an O3 layered oxide phase produced as described in Example 1 for the formation of a stoichiometric layered oxide. Post processing of this material leads to the loss of oxygen when post processing via heating under an inert atmosphere is undertaken.

Oxygen loss in $NaNi_{0.25}Na_{0.17}Mn_{4/12}Ti_{3/12}O_2$ Oxygen loss from the material was demonstrated using TGA-STA by reheating the sample to a temperature of 800° under a constant flow of $N_2$. The mass loss associated with reheating the material under air and under $N_2$ are compared in FIG. 1B. It can be seen that, while mass loss occurs owing to oxygen loss as the sample is heated in air, complete uptake of oxygen occurs in the sample heated in air upon subsequent cooling leading to no overall mass loss. In contrast the mass loss observed in the sample heated and subsequently cooled under nitrogen is 0.57% this equates to a stoichiometry if the mass loss is associated with oxygen of $NaNi_{0.25}Na_{0.17}Mn_{4/12}Ti_{3/12}O_{1.96}$ Electrochemically these materials show a benefit over samples which do not show nonstoichiometry in oxygen. The first three charge-discharge voltage profiles (Na-ion half cell Voltage against a sodium metal anode [V vs Na/Na+] verses Cathode specific capacity [mAh/g]) are shown in FIG. 1 D in which the sample produced by post processing in air and under $N_2$ are compared. It can be seen FIG. 1 D that inducing oxygen deficiency within this material leads to an slight decrease in the cycling capacity. However, there is also a slight reduction in the irreversible capacity loss on the first cycle with similar capacity fade over the first few cycles. The average voltage of each cell is similar at 2.97 and 3.10 V vs Na/Na+ for the sample post processed in air and nitrogen, respectively. Calculation of specific energy density of the materials yields values of 353 and 421 Wh/kg for sample post processed in air and nitrogen, respectively. Showing that oxygen non-stoichiometry in this material leads to a specific energy density gain verses the stoichiometric oxide.

The reduction of first cycle loss is also demonstrated in FIG. 1 E in which the differential capacity plot of the first electrochemical cycle is shown.

Figure 2A:
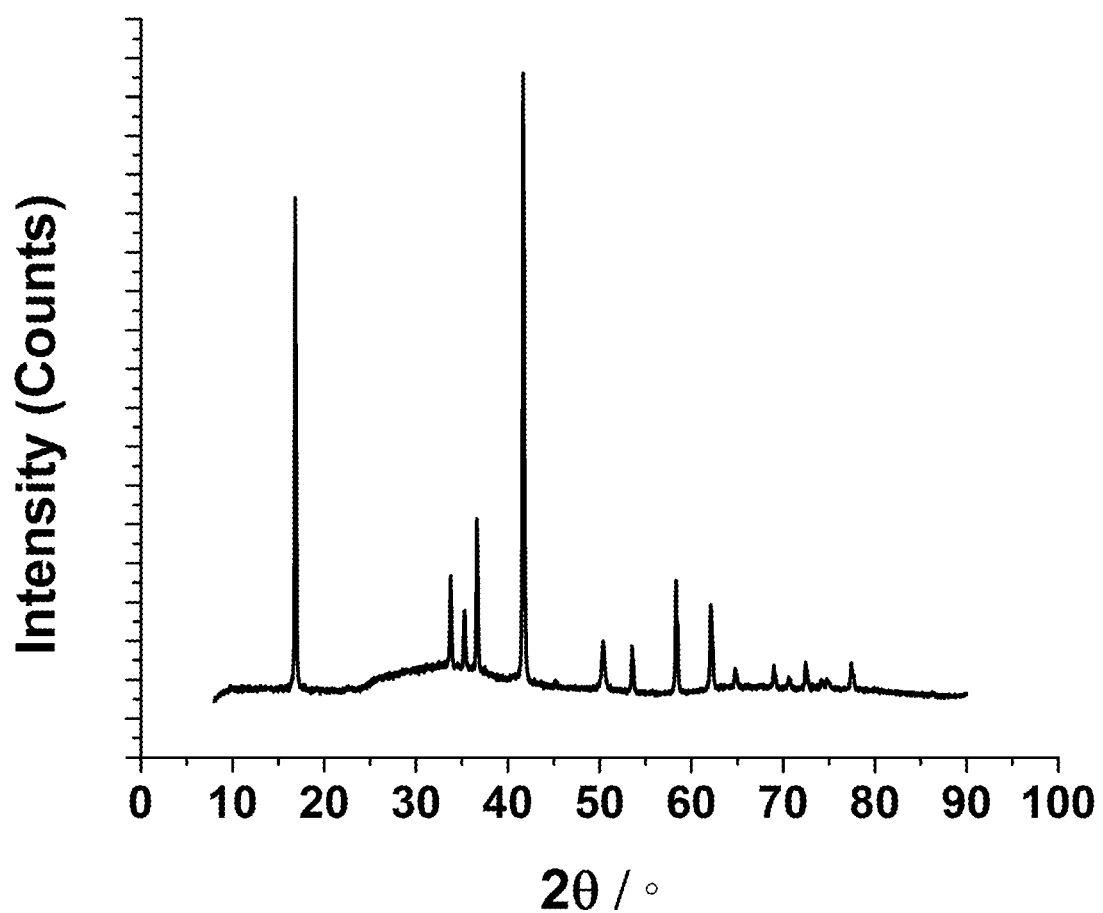
FIG. 2(A) shows Powder X-ray diffraction pattern of $NaNi_{0.25}Na_{0.17}Mn_{2/12}Ti_{5/12}O_2$ prepared according to Example 2.

With reference to Example 2 a material similar in structure to that given in Example 1. The data shown in FIG. 2A shows the Powder X-ray diffraction pattern of stoichiometric $NaNi_{0.25}Na_{0.17}Mn_{2/12}Ti_{5/12}O_2$ showing the formation of an O3 layered oxide phase produced as described in Example 2 for the formation of a stoichiometric layered oxide.

Figure 2B:
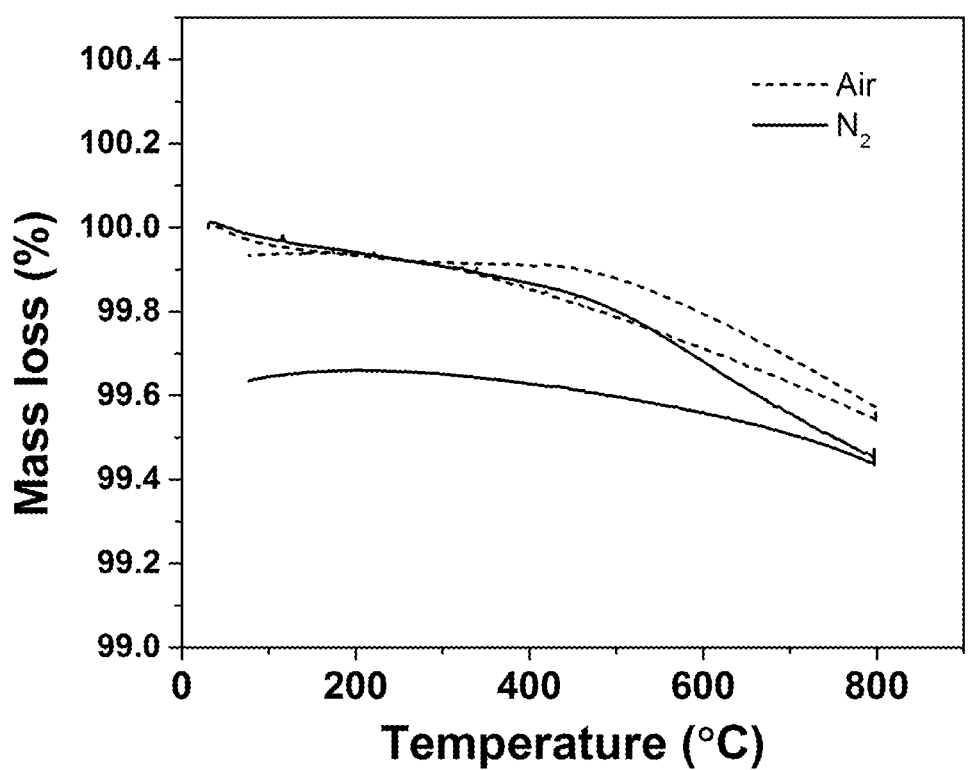
FIG. 2(B) shows the TGA-STA data obtained for $NaNi_{0.25}Na_{0.17}Mn_{2/12}Ti_{5/12}O_2$ (Example 2) heated to a temperature of 800° C. under a constant flow of air (dashed line) or under a constant flow of nitrogen (solid line).
Figure 2C:
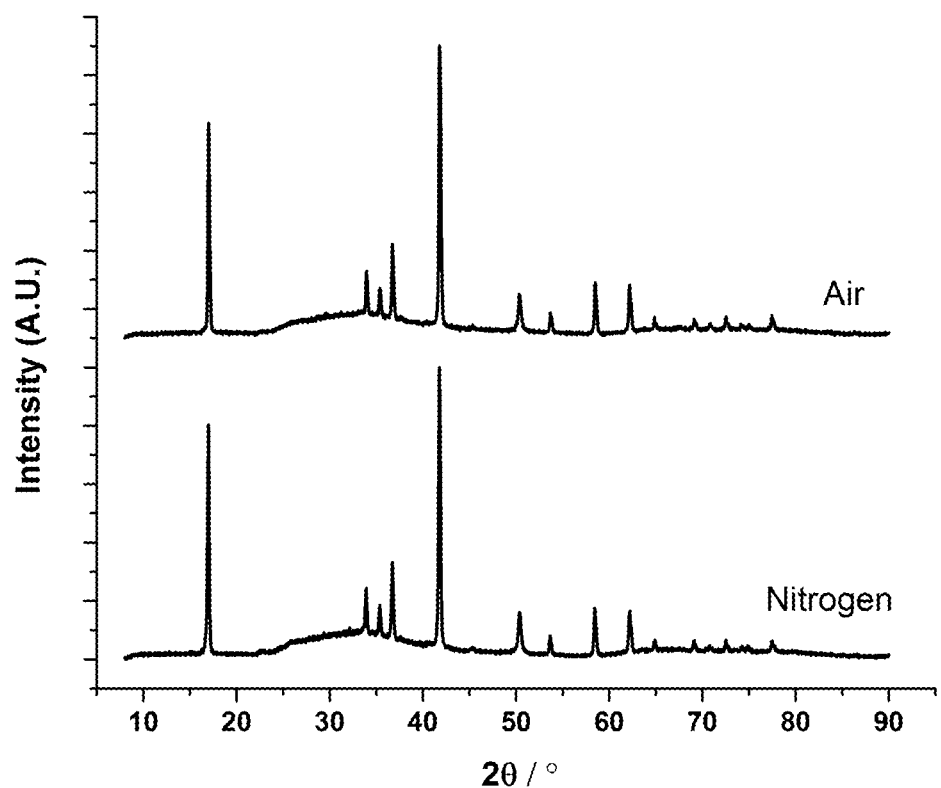
FIG. 2(C) Powder X-ray diffraction patterns of $NaNi_{0.25}Na_{0.17}Mn_{2/12}Ti_{5/12}O_2$ after being heated to 800° C. and cooled in either air or nitrogen.
Figure 2D:
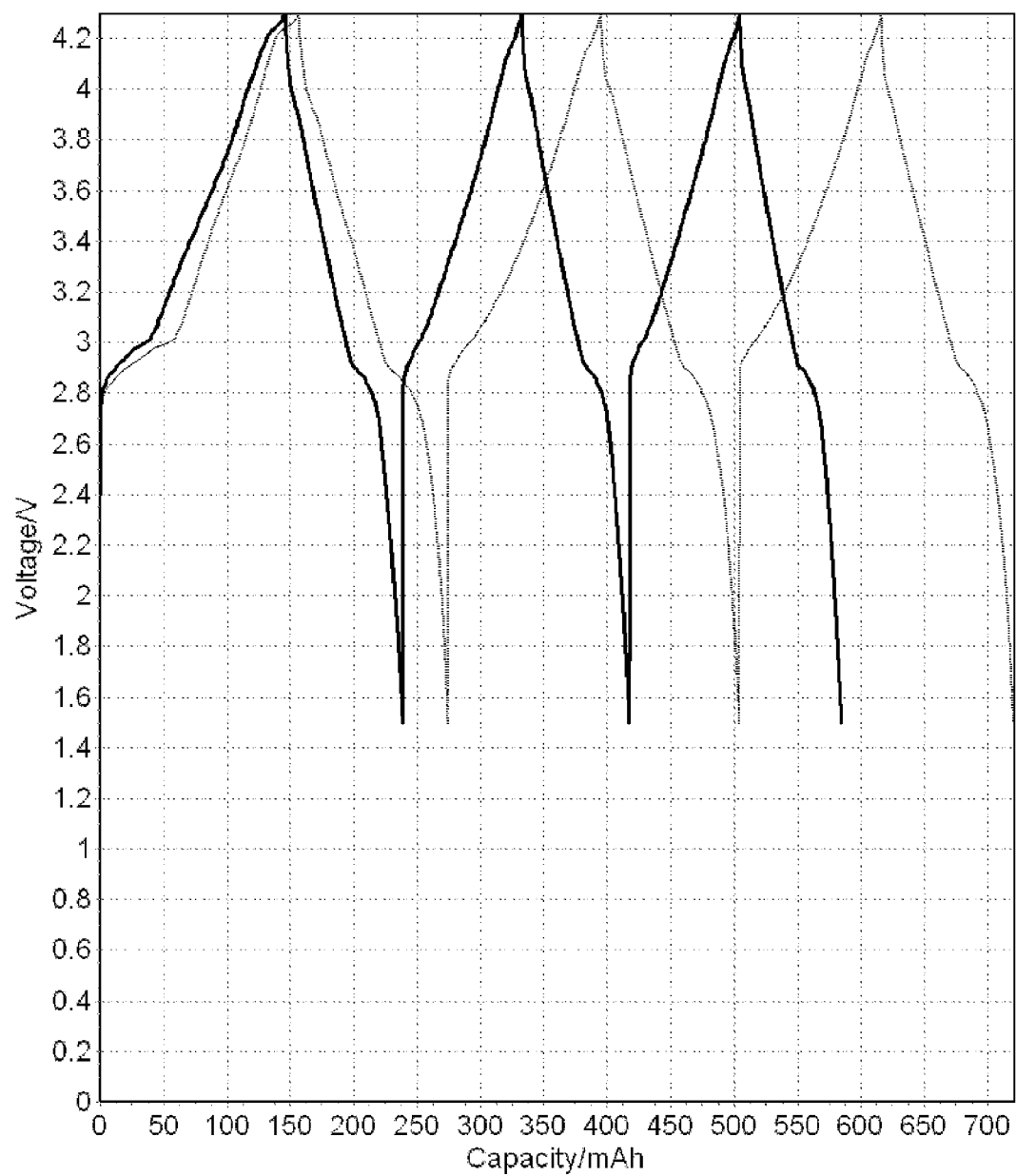
FIG. 2(D) shows the first three charge-discharge voltage profiles (Na-ion half cell Voltage [V vs Na/Na+] verses Cathode specific capacity [mAh/g]) for the cathode material prepared according to Example 2 after heating to 800° C. under a constant flow of air (Solid line) or under a constant flow of nitrogen (dashed line).

Oxygen loss from the material was demonstrated using TGA-STA by reheating the sample to a temperature of 800° under a constant flow of $N_2$. The mass loss associated with reheating the material under air and under $N_2$ are compared in FIG. 2B. In this material a mass loss of 0.4% was realised upon heating and subsequent cooling under $N_2$, this equates to a stoichiometry if the mass loss is associated with oxygen of $N Ni_{0.25}Na_{0.17}Mn_{0.166}Ti_{0.416}O_{1.97}$. It can be seen that complete uptake of oxygen occurs upon cooling of the sample heated in air leading to no overall mass loss. When compared to the mass loss shown in Example 1 the magnitude of oxygen deficiency within the material may be related to the content of a reducible transition metal within the structure. To confirm that no structural transitions occurred in the post processed sample a XRD pattern of the material is shown in FIG. 2C in which it can be seen that no structural transitions occur in the materials.

Figure 2E:
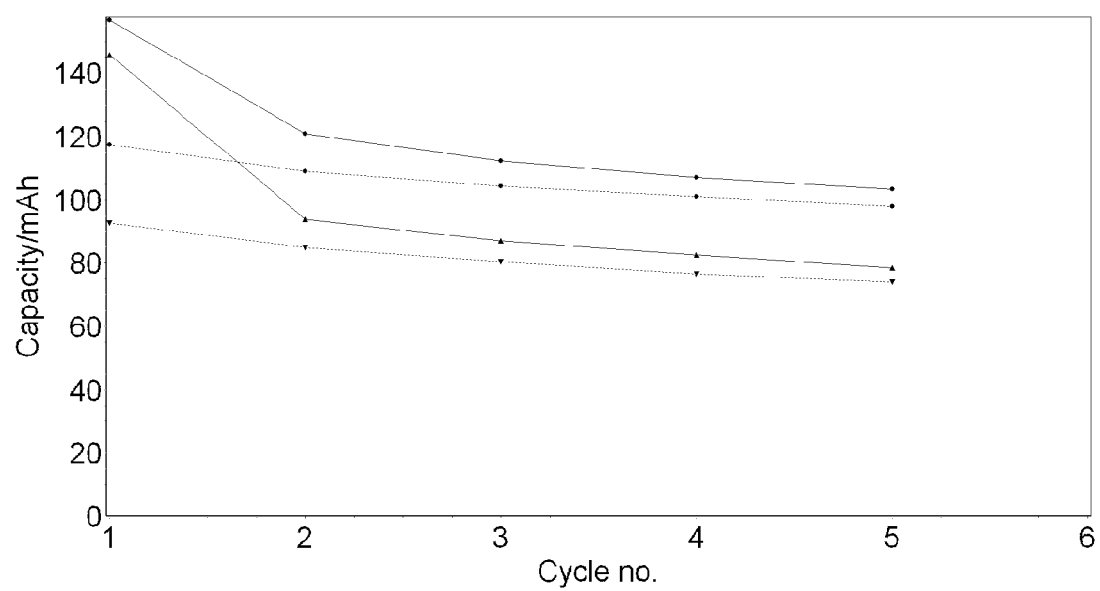
FIG. 2(E) shows the cycle life (Cathode specific capacity [mAh/g] vs cycle number) for the cathode material prepared according to Example 2 after heating to 800° C. under a constant flow of air (triangles) or under a constant flow of nitrogen (circles). Dotted line represents discharge and solid line represents charge.
Figure 2F:
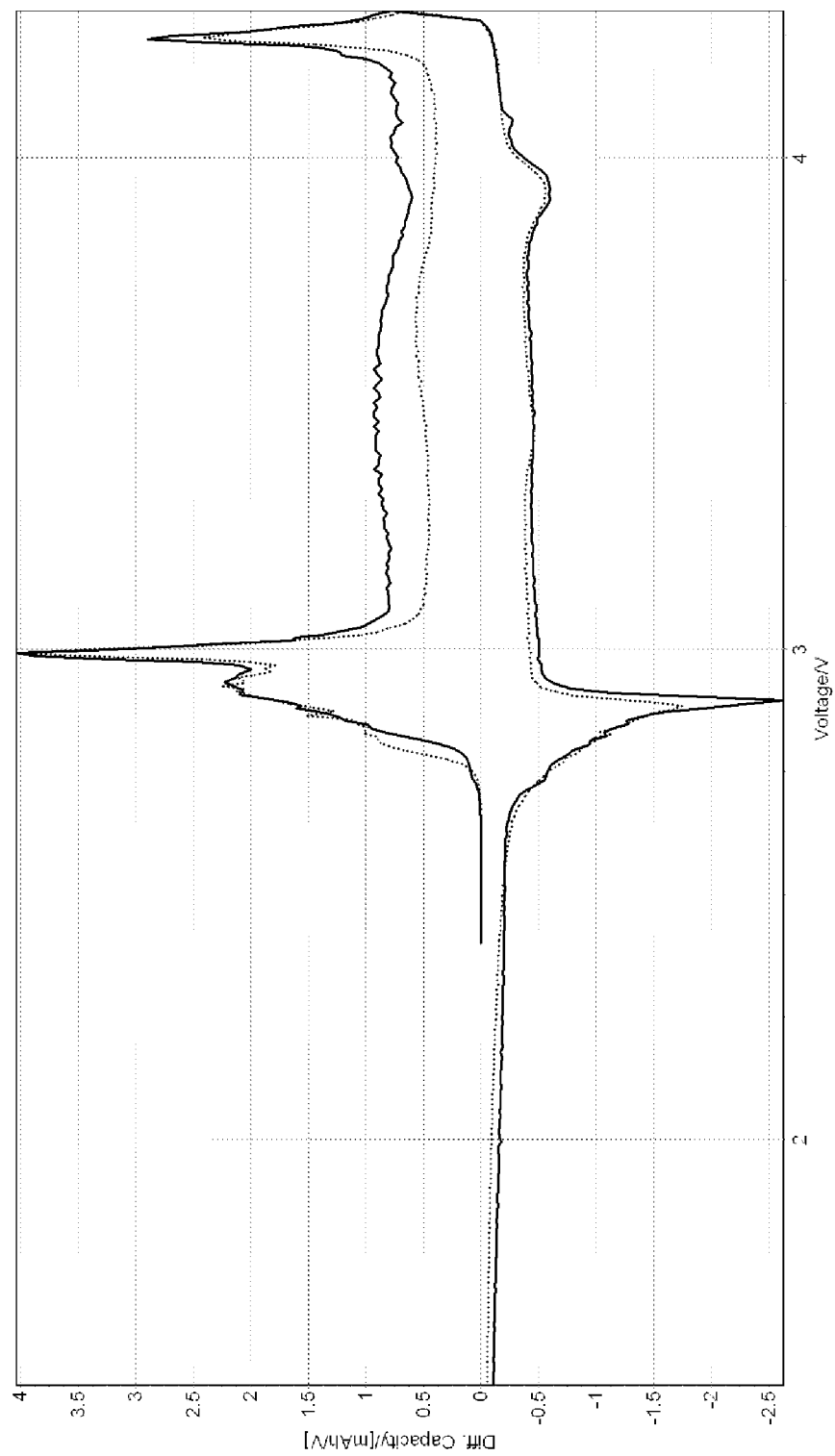
FIG. 2(F) shows the Differential Capacity Profiles for the $1^{st}$ charge cycle (Differential Capacity [mAh/g/V] verses Na-ion half Cell Voltage [V vs Na/Na+]) for the cathode material prepared according to Example 2 heated to a temperature of 800° C. under a constant flow of air (solid line) or under a constant flow of nitrogen (dashed line).

Electrochemically these materials can be differentiated in terms of performance. The first two charge-discharge voltage profiles (Na-ion half cell Voltage [V vs Na/Na+] verses Cathode specific capacity [mAh/g]) are shown in FIG. 2 D in which the sample produced by post processing in air and under $N_2$ are compared. It can be seen FIG. 2 D that inducing oxygen deficiency within this material leads to an increase in the cycling capacity, and a reduction in the irreversible capacity loss on the first cycle. Also suggesting a relationship between transition metal elements present and cycling capacity. The average voltage of each cell is similar at 3.09 and 3.12 V vs Na/Na+ for the sample post processed in air and nitrogen, respectively. Calculation of specific energy density yields 285 and 369 Wh/kg for the sample post processed in air or nitrogen, respectively. The increase in specific energy density shown in the oxygen deficient materials is a distinct advantage, in for example, an electrochemical cell. FIG. 2E compares the cycling capacities and capacity retention of the materials produced from Example 2. The Differential Capacity Profiles for the $1^{st}$ charge cycle (Differential Capacity [mAh/g/V] verses Na-ion half Cell Voltage [V vs Na/Na+]) are shown in FIG. 2 F in which the reduction of irreversibility in the material can be attributed to a peak centered at 4.15 V vs Na/Na+, this is usually attributed to oxygen loss in O3 layered oxide materials. From the differential capacity plot shown in FIG. 2 F we believe that oxygen deficient materials show lower oxygen loss on cycling to high voltages which may also be beneficial in manufacture of full cells based on these materials.

Figure 3A:
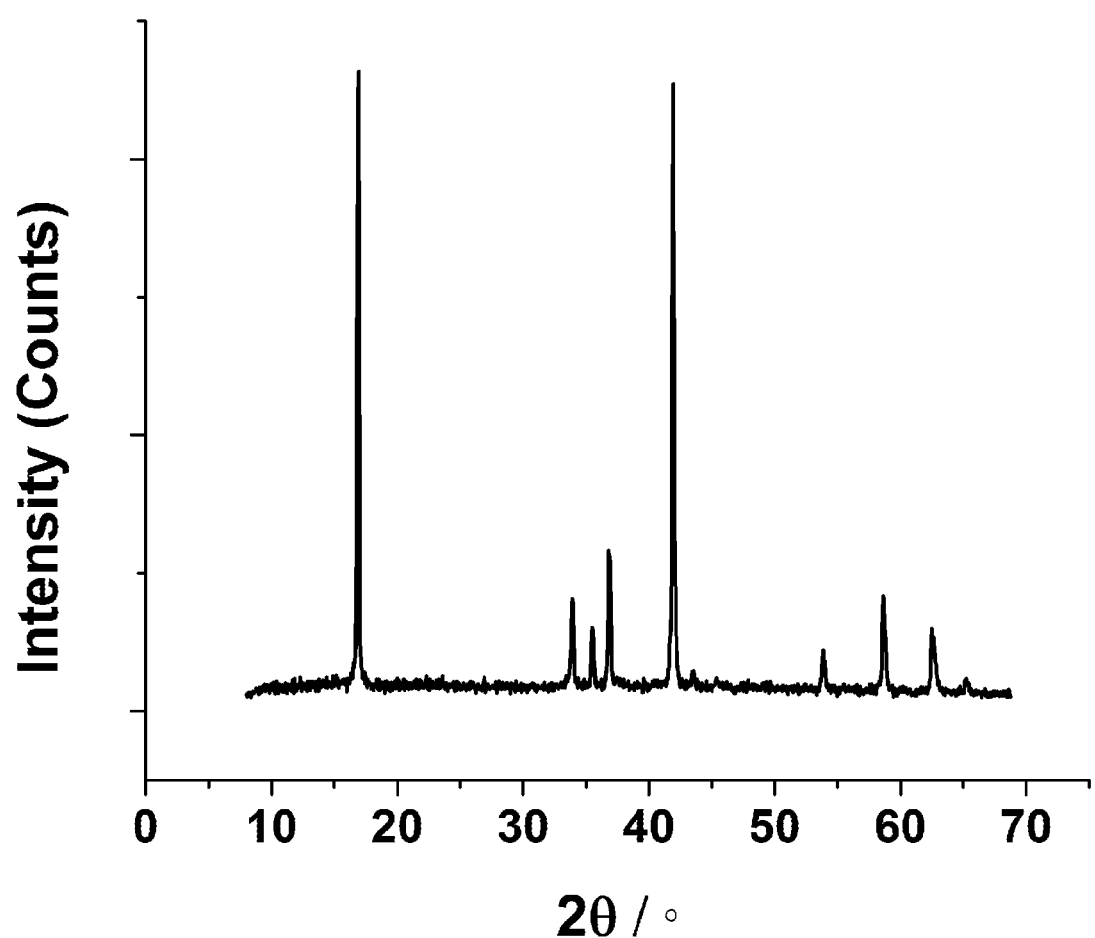
FIG. 3(A) shows Powder X-ray diffraction pattern of $NaNi_{0.25}Na_{0.17}Mn_{5/12}Ti_{2/12}O_2$ prepared according to Example 3.
Figure 3B:
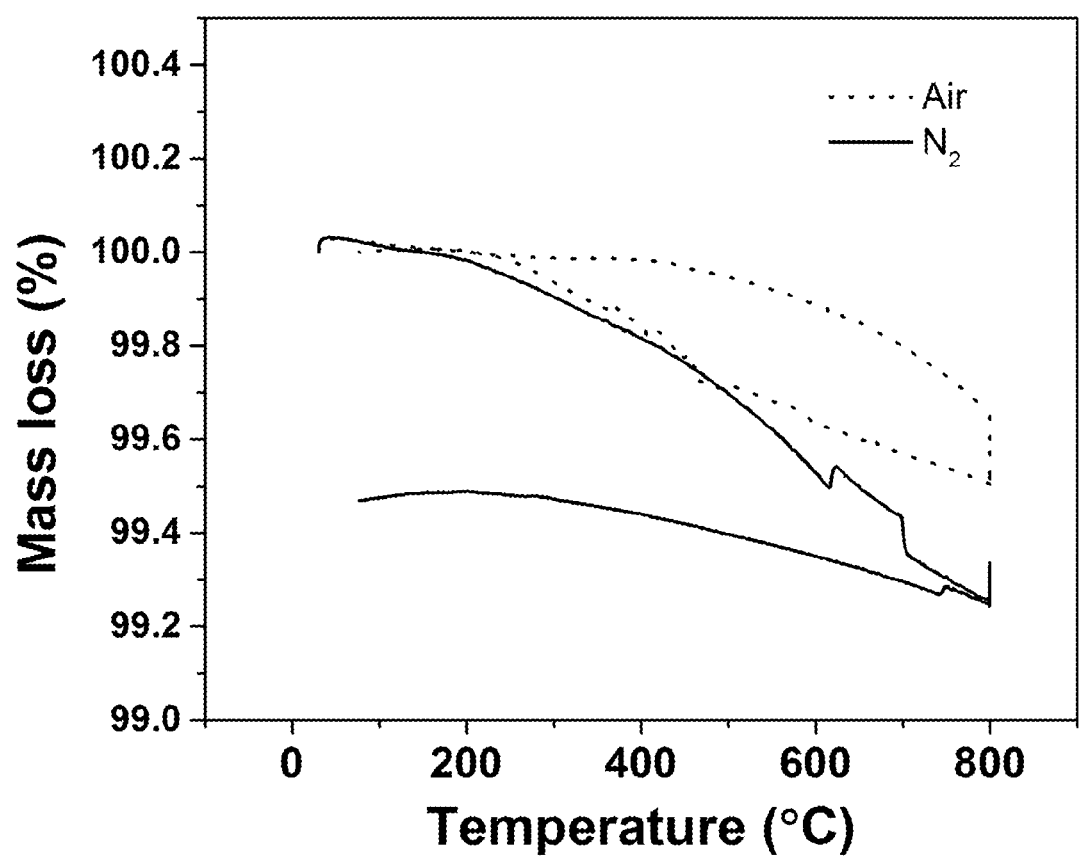
FIG. 3(B) shows the TGA-STA data obtained for $NaNi_{0.25}Na_{0.17}Mn_{5/12}Ti_{2/12}O_2$ (Example 3) heated to a temperature of 800° C. under a constant flow of air (dashed line) or under a constant flow of nitrogen (solid line).
Figure 3C:
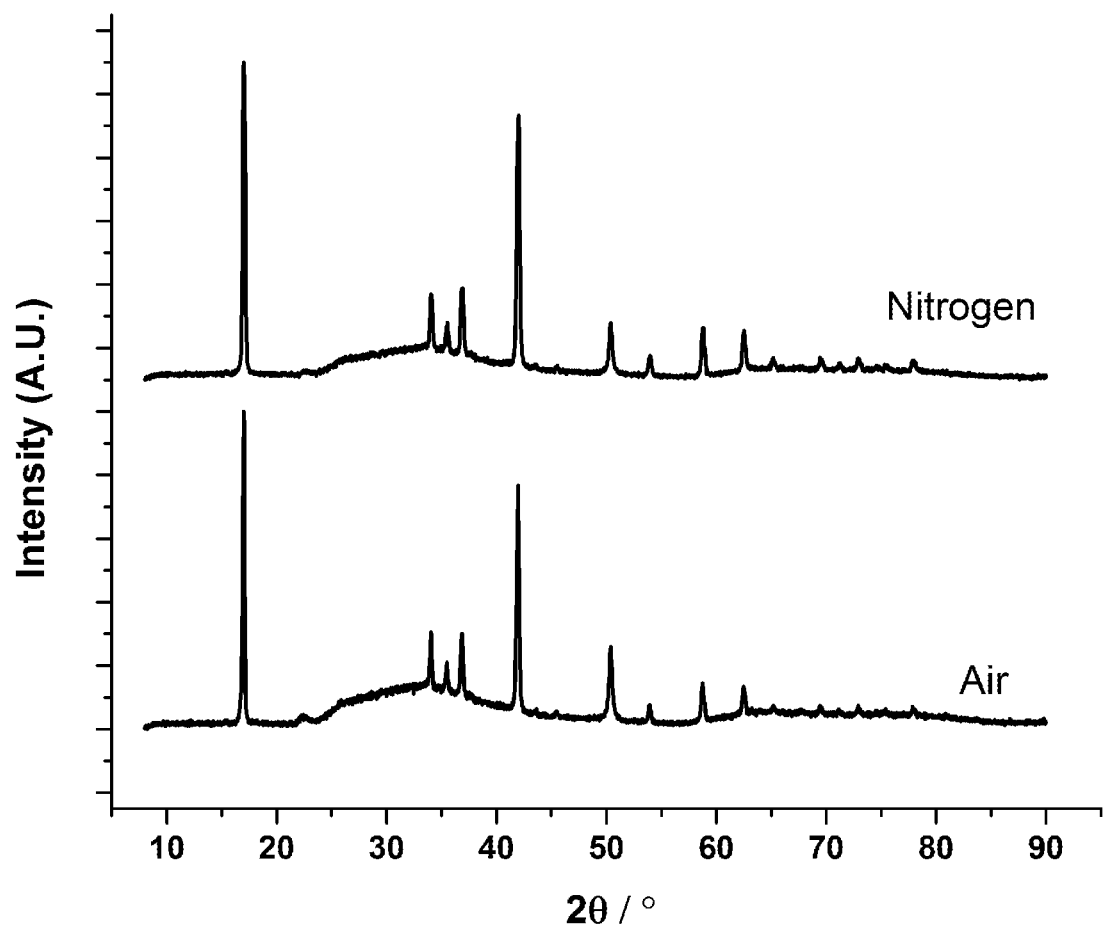
FIG. 3(C) Powder X-ray diffraction patterns of $NaNi_{0.25}Na_{0.17}Mn_{5/12}Ti_{2/12}O_2$ after being heated to 800° C. and cooled in either air or nitrogen.
Figure 3D:
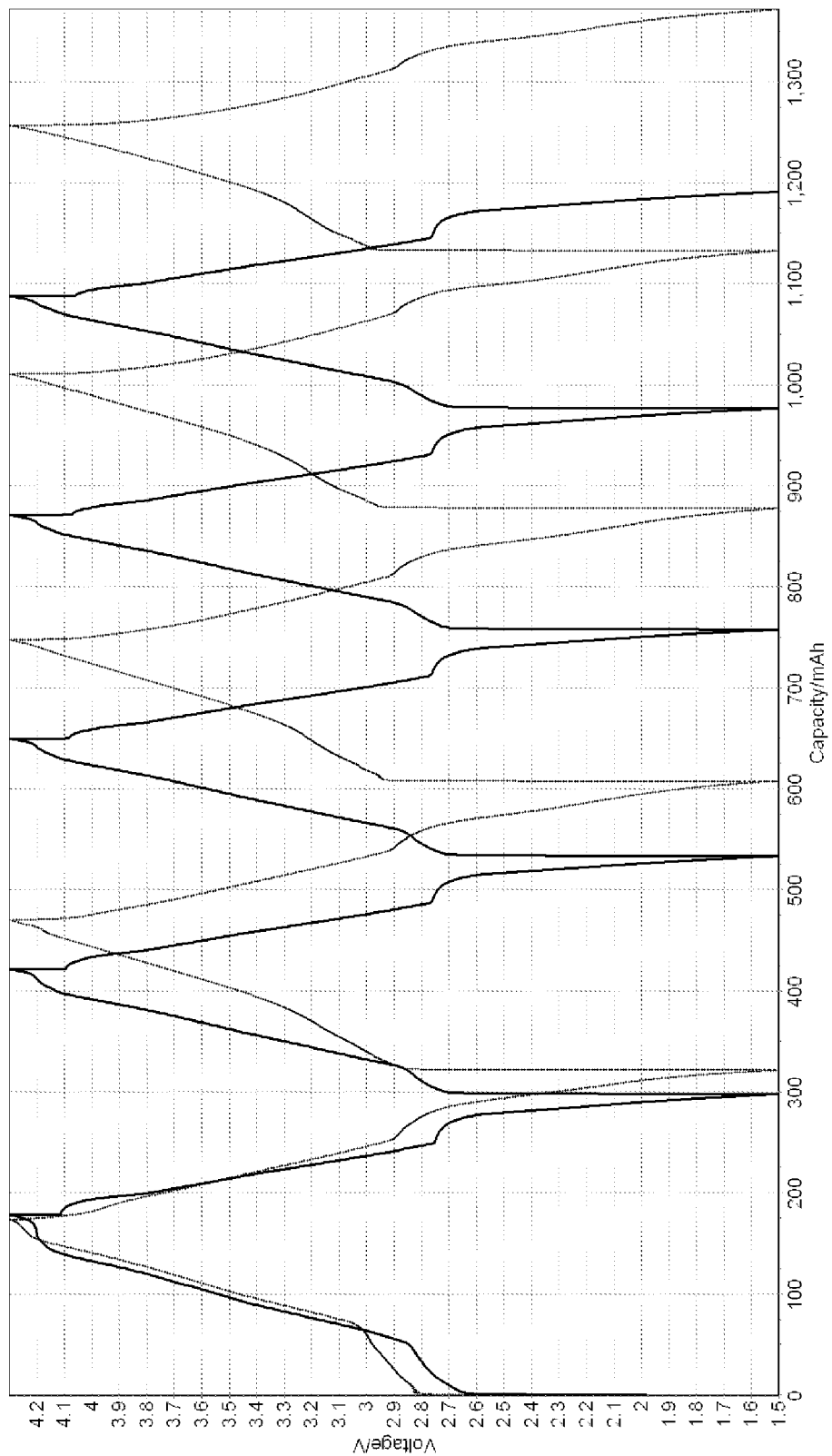
FIG. 3(D) shows the first four charge-discharge voltage profiles (Na-ion half cell Voltage [V vs Na/Na+] verses Cathode specific capacity [mAh/g]) for the cathode material prepared according to Example 3 after heating to 800° C. under a constant flow of air (solid line) or under a constant flow of nitrogen (dashed line).

With reference to Example 3, this material is a compositional variant of Examples 1 and 2. FIG. 3A shows the Powder X-ray diffraction pattern of stoichiometric $NaNi_{0.25}Na_{0.17}Mn_{5/12}Ti_{2/12}O_2$ showing the formation of an O3 layered oxide phase produced as described in Example 3 for the formation of a stoichiometric layered. In this material a mass loss of 0.56% was realised when post processed by heating and cooling under $N_2$ under the same conditions used in Examples 1 and 2, this equates to a stoichiometry if the mass loss is associated with oxygen of $NaNi_{0.25}Na_{0.17}Mn_{5/12}Ti_{2/12}O_{1.96}$. Which is of similar magnitude to that observed in Examples 1 and 2.

Figure 3E:
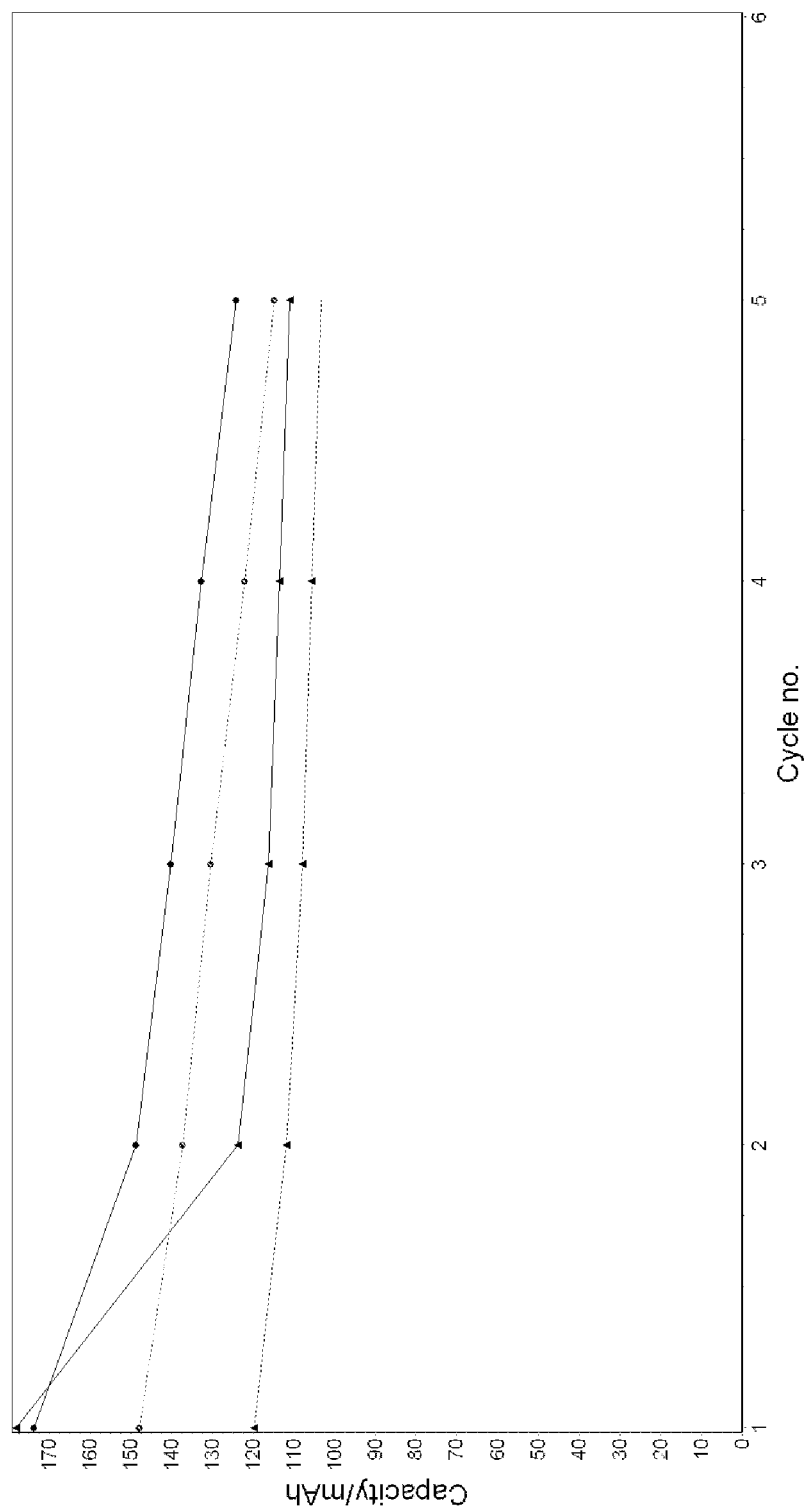
FIG. 3(E) shows the cycle life (Cathode specific capacity [mAh/g] vs cycle number) for the cathode material prepared according to Example 3 after heating to 800° C. under a constant flow of air (triangles) or under a constant flow of nitrogen (circles). Dotted line represents discharge and solid line represents charge.
Figure 3F:
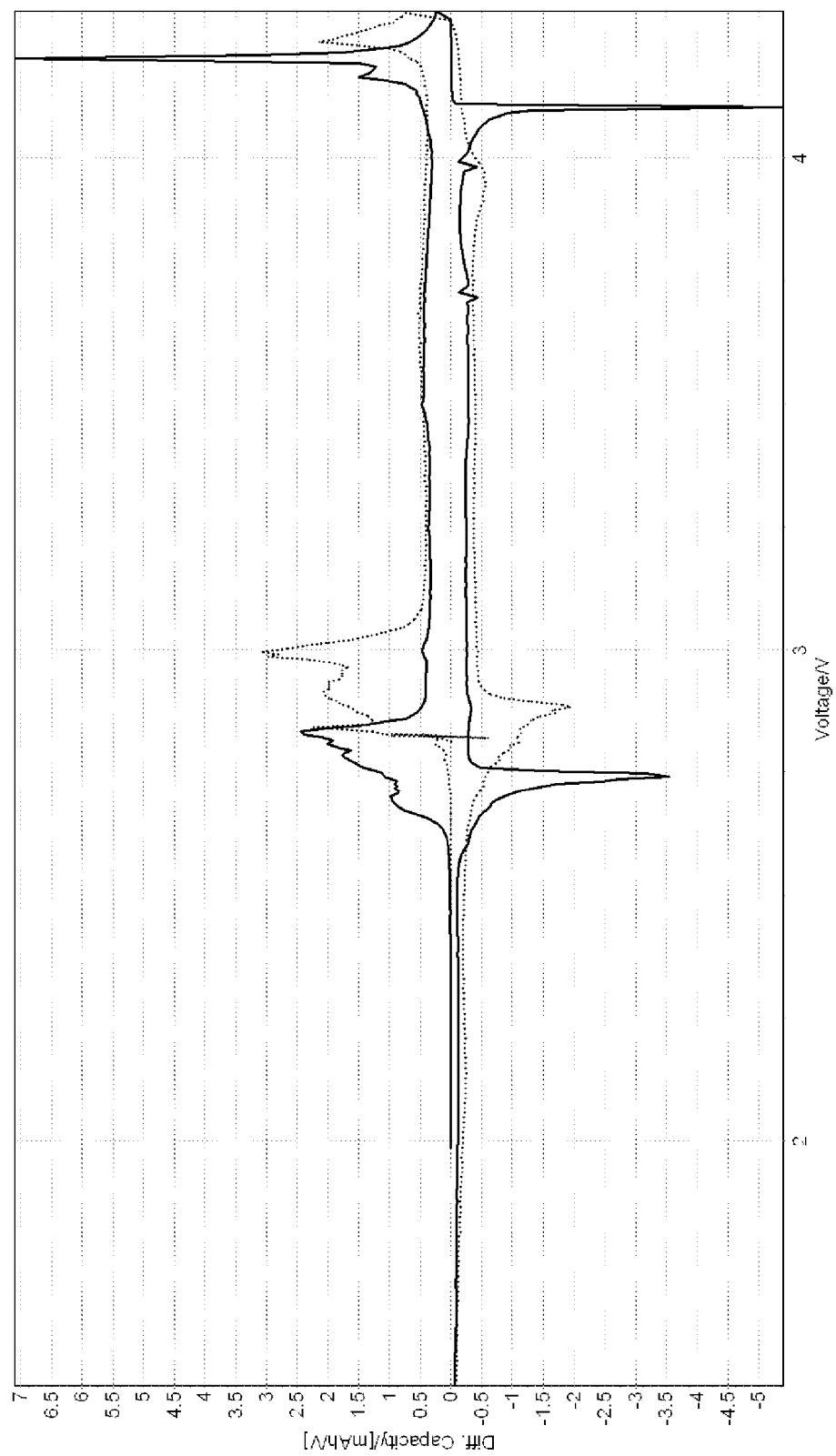
FIG. 3(F) shows the Differential Capacity Profiles for the $1^{st}$ charge cycle (Differential Capacity [mAh/g/V] verses Na-ion half Cell Voltage [V vs Na/Na+]) for the cathode material prepared according to Example 3 heated to a temperature of 800° C. under a constant flow of air (dashed line) or under a constant flow of nitrogen (solid line).

Electrochemically Example 3 shows similar material properties to those observed in Examples 1 and 2. However, this material may also be differentiated in terms of performance to the stoichiometric variant. The first four charge-discharge voltage profiles (Na-ion half cell Voltage [V vs Na/Na+] verses Cathode specific capacity [mAh/g]) are shown in FIG. 3 D in which the sample produced by post processing in air and under $N_2$ are compared. It can be seen FIG. 3 D that inducing oxygen deficiency within this material leads to an increase in the cycling capacity, and a reduction in the irreversible capacity loss on the first cycle. The average voltage of each cell is similar at 3.05 and 3.07 V vs Na/Na+ for the sample post processed in air and nitrogen, respectively. Calculation of specific energy density yields 367 and 451 Wh/kg for the sample post processed in air or nitrogen, respectively. The increase in specific energy density shown in the oxygen deficient materials is a distinct advantage, in for example, an electrochemical cell. FIG. 3E compares the cycling capacities and capacity retention of the materials produced from Example 2. The Differential Capacity Profiles for the $1^{st}$ charge cycle (Differential Capacity [mAh/g/V] verses Na-ion half Cell Voltage [V vs Na/Na+]) are shown in FIG. 2 F in which the reduction of irreversibility in the material can be attributed to a peak centered at 4.15 V vs Na/Na+, this is usually attributed to oxygen loss in O3 layered oxide materials. From the differential capacity plot shown in FIG. 3F we believe that oxygen deficient materials show lower oxygen loss on cycling to high voltages which may also be beneficial in manufacture of full cells based on these materials. We have demonstrated that this oxygen loss consistently results in a reduced first cycle loss and a slight increase in the average potential of a cell constructed from oxygen deficient layered oxides.

Figure 4A:
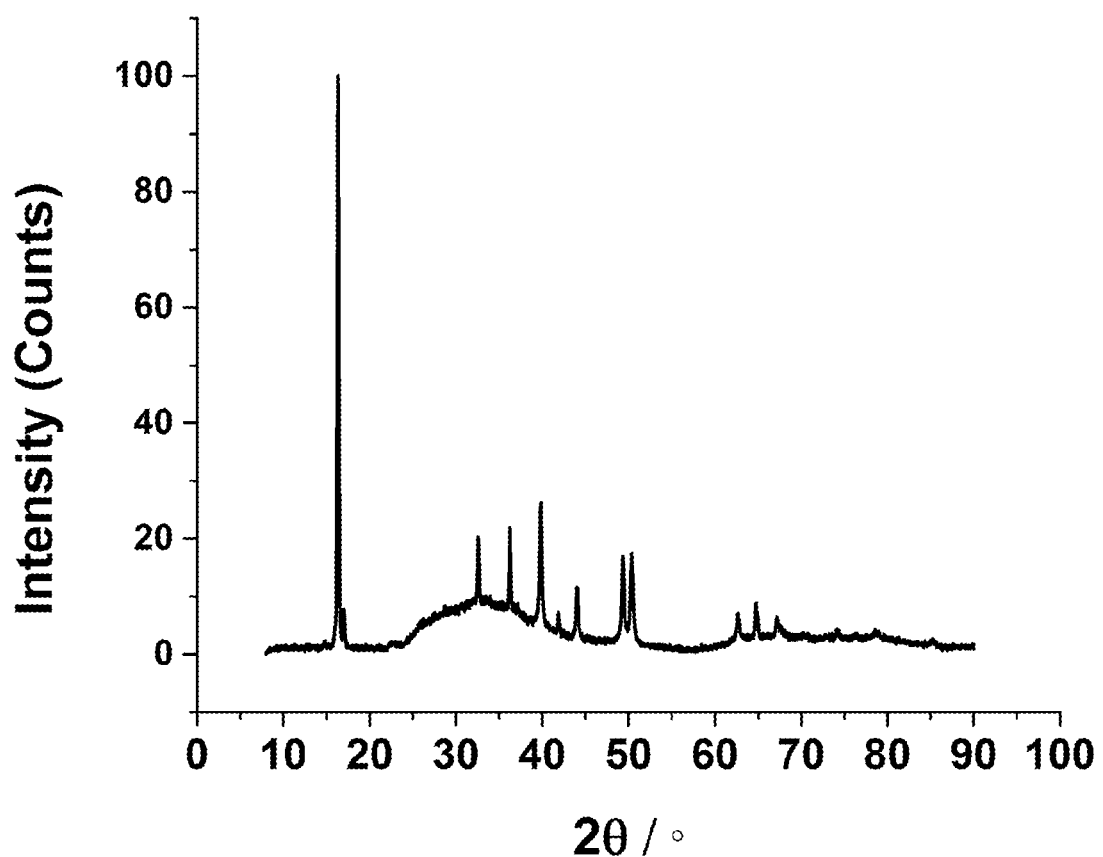
FIG. 4(A) shows Powder X-ray diffraction pattern of $Na_{2/3}Ni_{1/3}Mn_{2/3}O_2$ prepared according to Example 4.
Figure 4B:
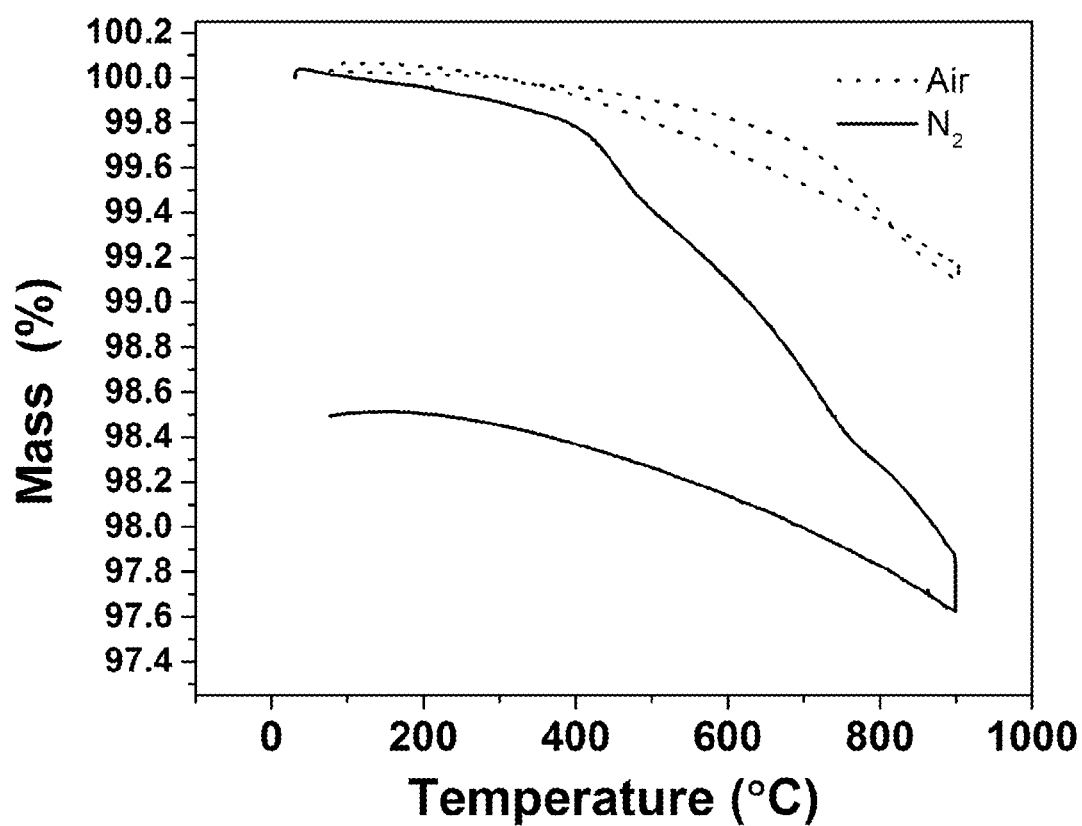
FIG. 4(B) shows the TGA-STA data obtained for $Na_{2/3}Ni_{1/3}Mn_{2/3}O_2$ (Example 4) heated to a temperature of 900° C. under a constant flow of air (dashed line) or under a constant flow of nitrogen (solid line).
Figure 4C:
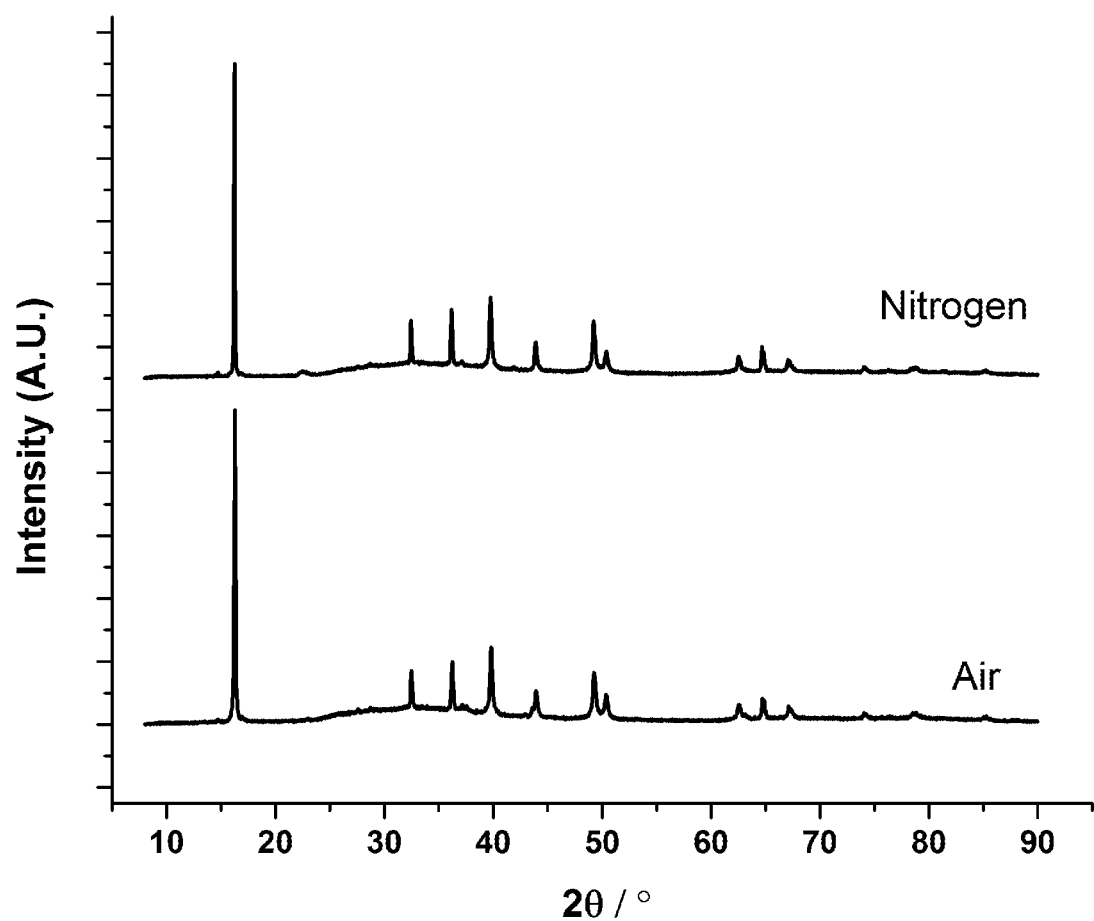
FIG. 4(C) Powder X-ray diffraction patterns of $Na_{2/3}Ni_{1/3}Mn_{2/3}O_2$ after being heated to 900° C. and cooled in either air or nitrogen.
Figure 4D:
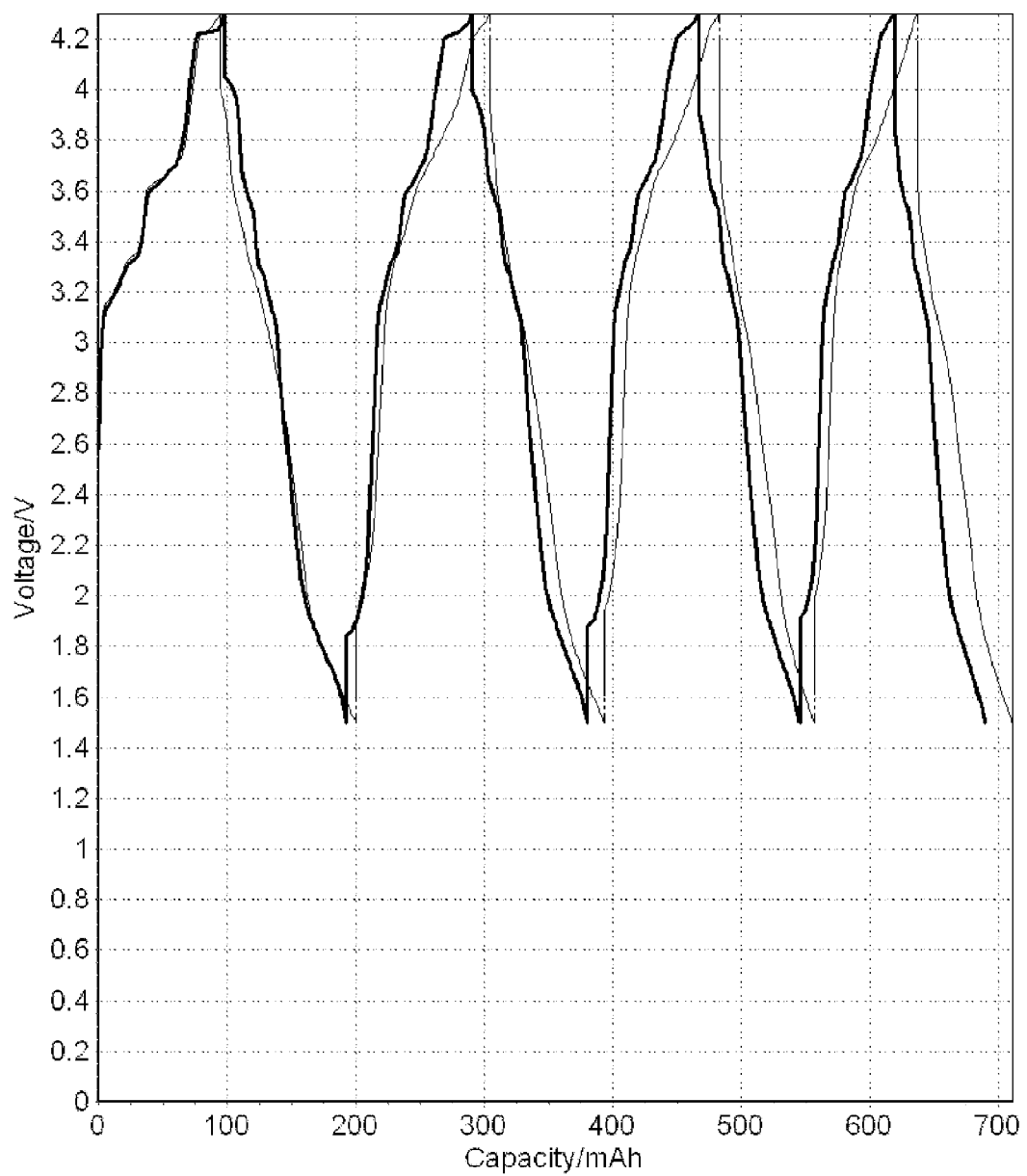
FIG. 4(D) shows the first four charge-discharge voltage profiles (Na-ion half cell Voltage [V vs Na/Na+] verses Cathode specific capacity [mAh/g]) for the cathode material prepared according to Example 4 after heating to 900° C. under a constant flow of air (solid line) or under a constant flow of nitrogen (dashed line).

With reference to Example 4, this material is an example of a layered oxide material which can be stabilized in an oxygen non-stoichiometric form which contains less than one Na atom per formula unit. FIG. 4A shows the Powder X-ray diffraction pattern of stoichiometric $Na_{2/3}Ni_{1/3}Mn_{2/3}O_2$ showing the formation of an P2 layered oxide product. In this material a mass loss of 1.55% was realised when post processed by heating to 900° C. and cooling under $N_2$ this equates to a stoichiometry if the mass loss is associated with oxygen of $Na_{2/3}Ni_{1/3}Mn_{2/3}O_{1.91}$ which is of greater magnitude to that observed in previous examples.

Figure 4E:
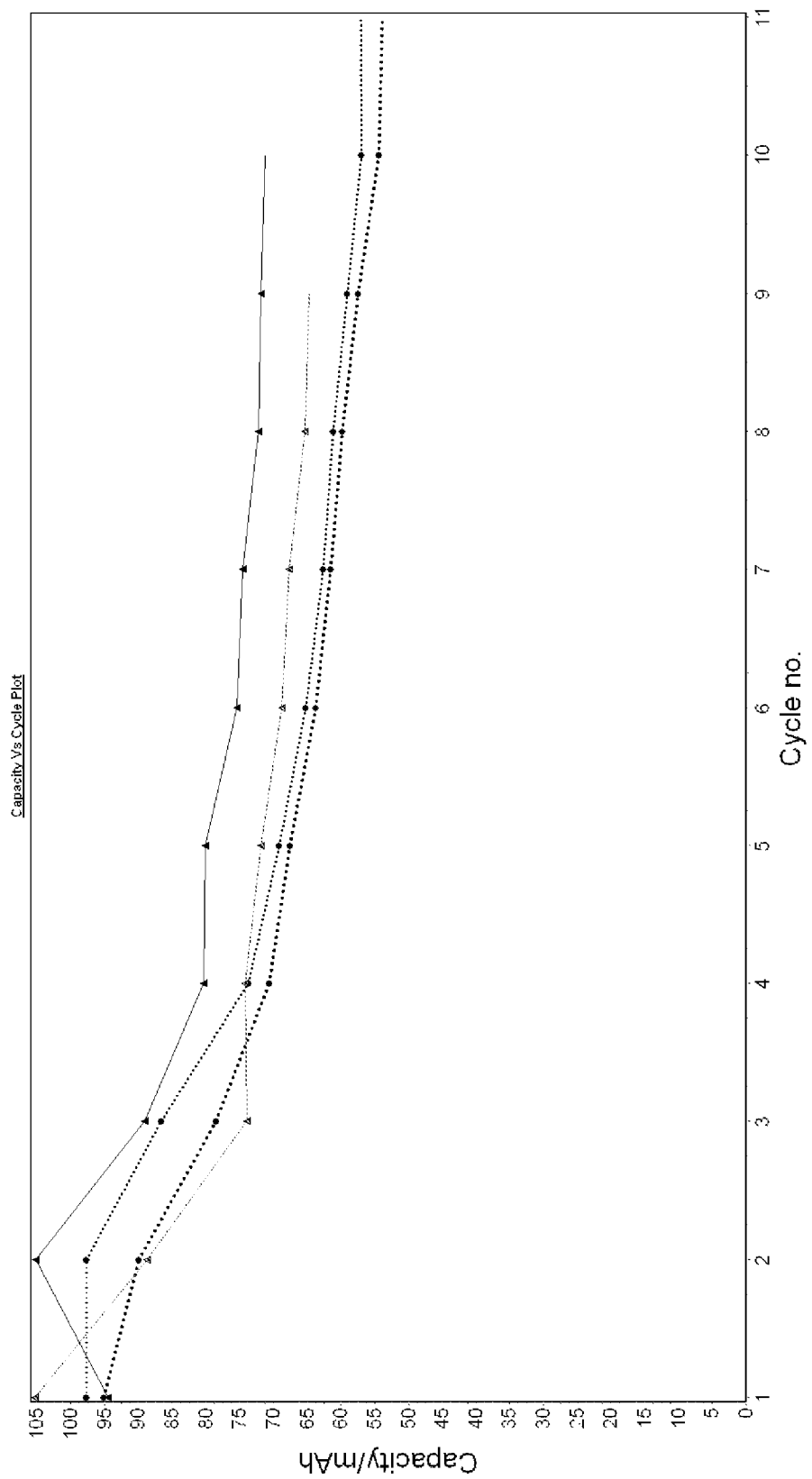
FIG. 4(E) shows the cycle life (Cathode specific capacity [mAh/g] vs cycle number) for the cathode material prepared according to Example 4 after heating to 900° C. under a constant flow of air (circles) or under a constant flow of nitrogen (triangles). Dotted line represents discharge and solid line represents charge.
Figure 4F:
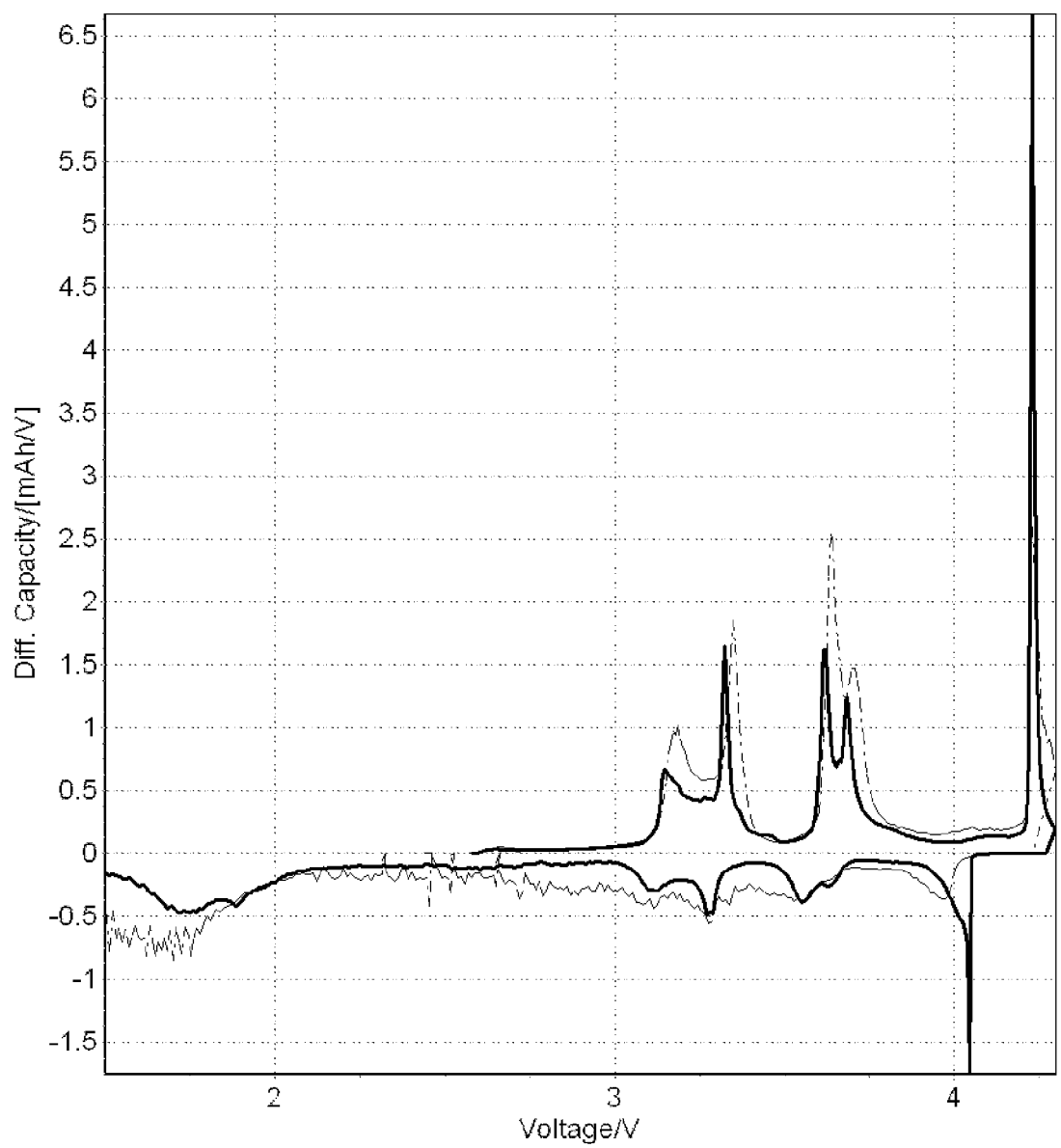
FIG. 4(F) shows the Differential Capacity Profiles for the $1^{st}$ charge cycle (Differential Capacity [mAh/g/V] verses Na-ion half Cell Voltage [V vs Na/Na+]) for the cathode material prepared according to Example 4 heated to a temperature of 900° C. under a constant flow of air (dashed line) or under a constant flow of nitrogen (solid line).

Electrochemically Example 4 shows similar material properties to those observed in the O3 layered oxide materials described in examples 1-3. However, this material can also be clearly differentiated in terms of electrochemical performance to the stoichiometric variant. The first four charge-discharge voltage profiles (Na-ion half cell Voltage [V vs Na/Na+] verses Cathode specific capacity [mAh/g]) are shown in FIG. 4 D in which the sample produced by post processing in air and under $N_2$ are compared. It can be seen FIG. 4 D that inducing oxygen deficiency within this material leads to an increase in the cycling capacity 97 mAh/g and 87 mAh/g for the non-stoichiometric and stoichiometric samples. The average voltage is also increased by inducing oxygen non stoichiometry in the sample and this raises from 2.50V vs Na/Na+ to 2.71V vs Na/Na+ for the sample post processed in air, respectively. Calculation of specific energy density yields 262 and 215 Wh/kg for the sample post processed in nitrogen and air, respectively. FIG. 4E compares the cycling capacities and capacity retention of the materials produced from Example 4 in which it can be seen that the oxygen non-stoichiometric form of Example 4 shows higher capacity retention over the first few electrochemical cycles. The Differential Capacity Profiles for the $1^{st}$ charge cycle (Differential Capacity [mAh/g/V] verses Na-ion half Cell Voltage [V vs Na/Na+]) are shown in FIG. 4 F in which it can be seen that the irreversibility in this P2 material is similar between the stoichiometric and non-stoichiometric with a similar voltage profile.

Figure 5A:
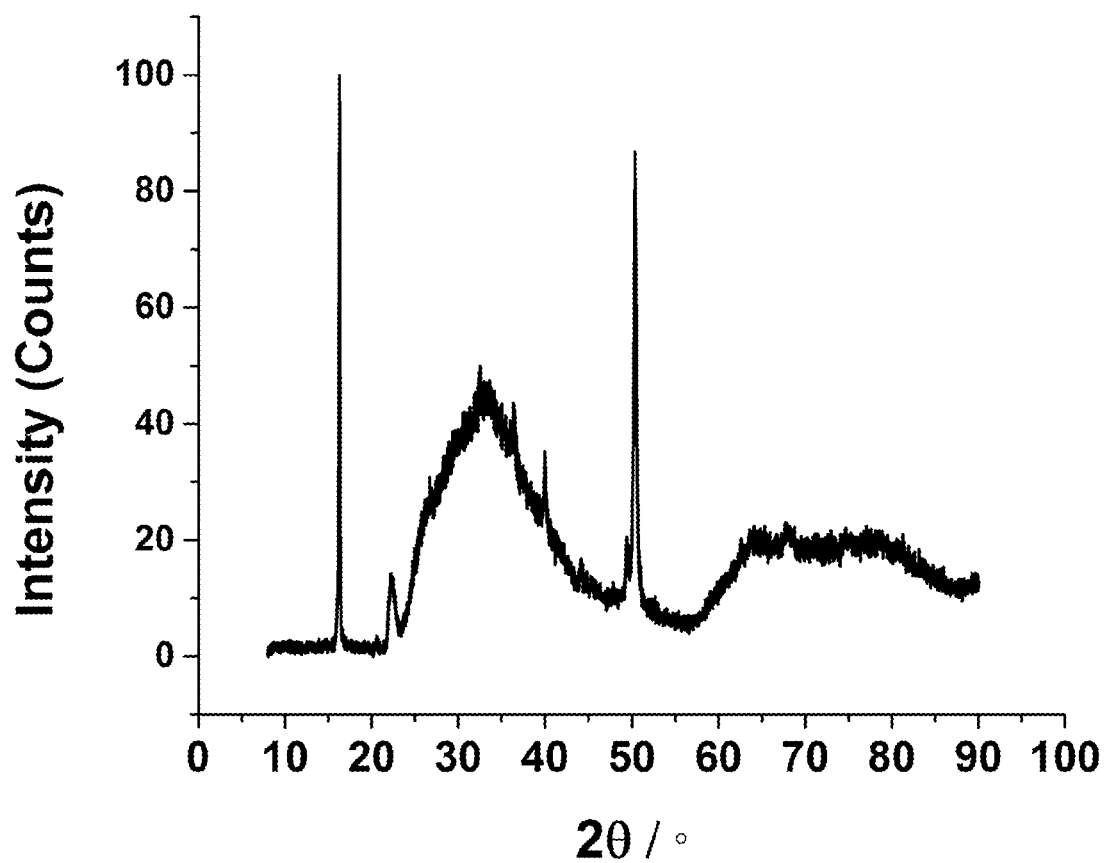
FIG. 5(A) shows Powder X-ray diffraction pattern of $Na_{0.76}Mn_{0.65}Co_{0.18}Ni_{0.17}O_2$ prepared according to Example 5.
Figure 5B:
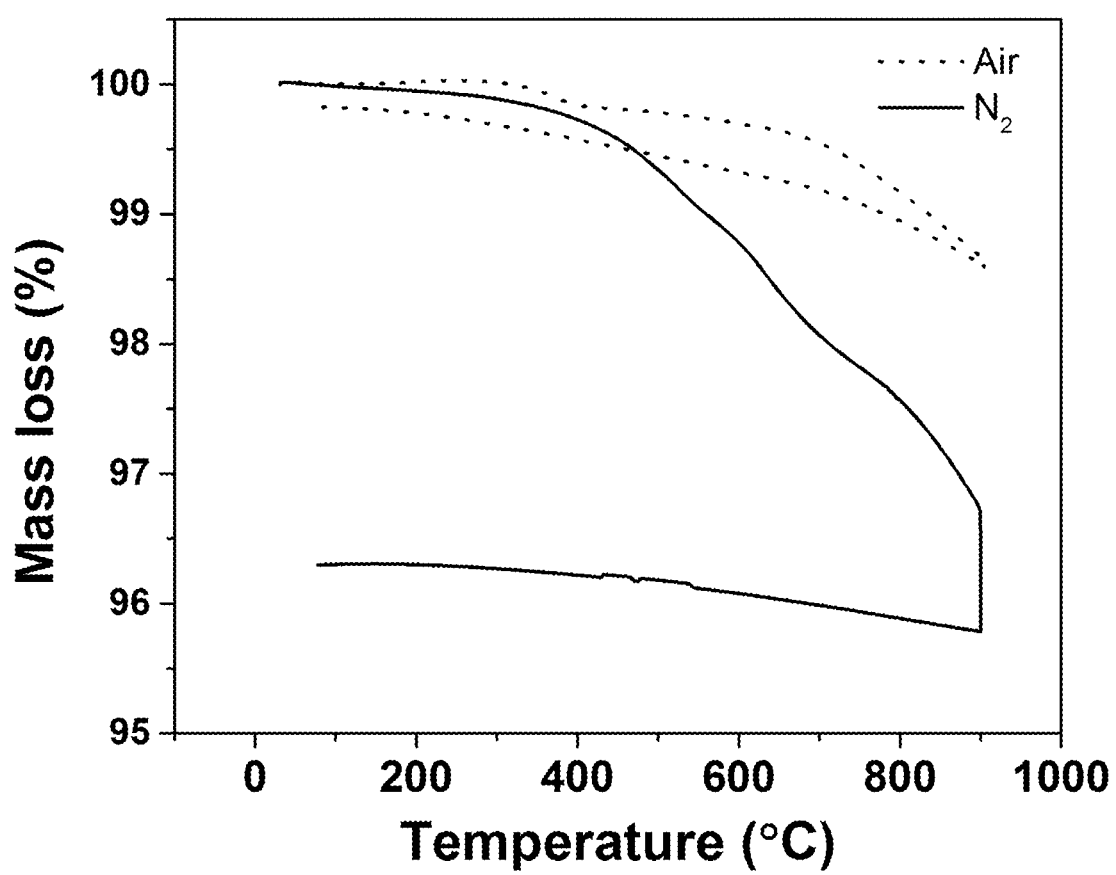
FIG. 5(B) shows the TGA-STA data obtained for $Na_{0.76}Mn_{0.65}Co_{0.18}Ni_{0.17}O_2$ (Example 5) heated to a temperature of 900° C. under a constant flow of air (dashed line) or under a constant flow of nitrogen (solid line).
Figure 5C:
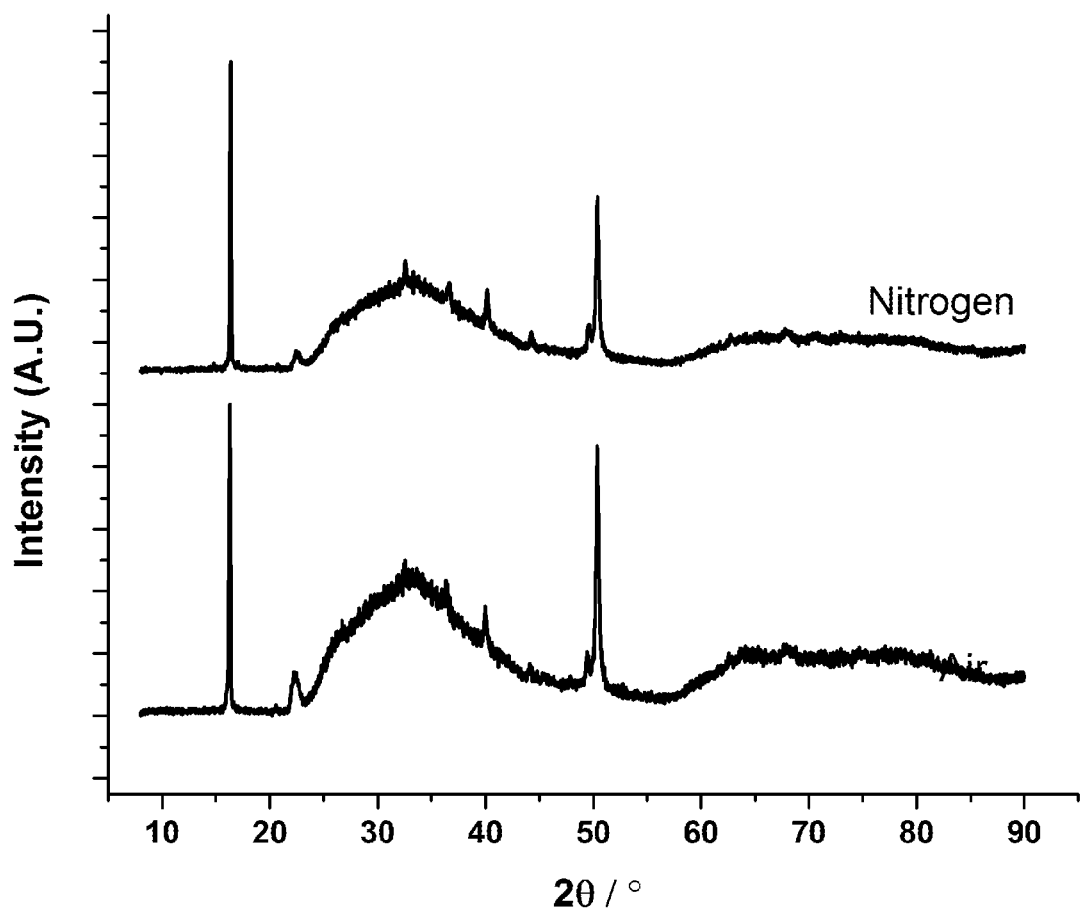
FIG. 5(C) Powder X-ray diffraction patterns of $Na_{0.76}Mn_{0.65}Co_{0.18}Ni_{0.17}O_2$ after being heated to 900° C. and cooled in either air or nitrogen.
Figure 5D:
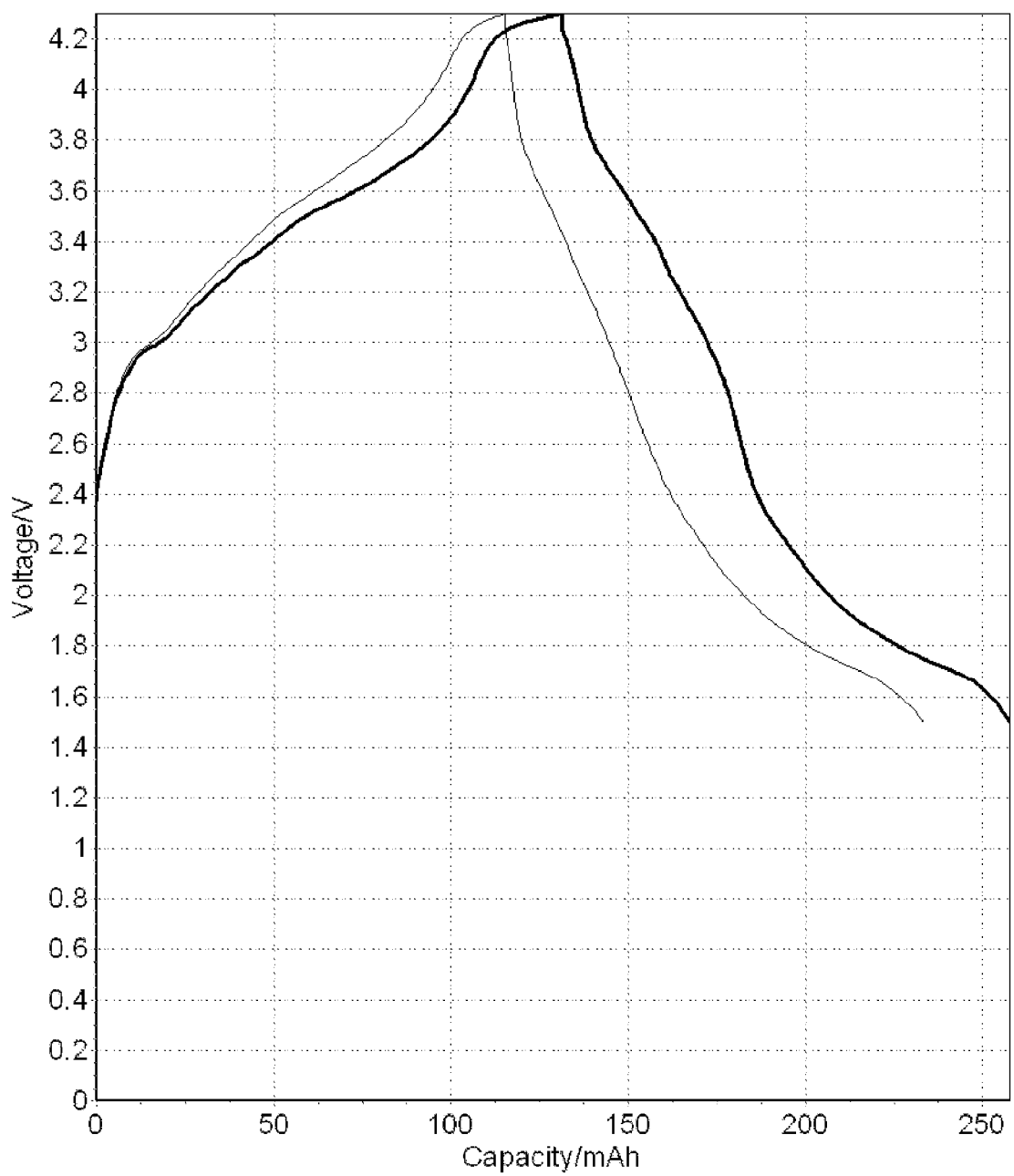
FIG. 5(D) shows the first charge-discharge cycle voltage profile (Na-ion half cell Voltage [V vs Na/Na+] verses Cathode specific capacity [mAh/g]) for the cathode material prepared according to Example 5 after heating to 900° C. under a constant flow of air (solid line) or under a constant flow of nitrogen (dashed line).

With reference to Example 5, this material is a an example of a layered oxide material which can be stabilized in an oxygen non-stoichiometric form which contains less than one Na atom per formula unit and forms a P2 layered structure. FIG. 5A shows the Powder X-ray diffraction pattern of stoichiometric $Na_{0.76}Mn_{0.65}Co_{0.18}Ni_{0.17}O_2$ showing the formation of an P2 layered oxide product as described in Table 1. In this material a mass loss of 3.67% was realised when post processed by heating to 900° C. and cooling under $N_2$ this equates to a stoichiometry if the mass loss is associated with oxygen of $Na_{0.76}Mn_{0.65}Co_{0.18}Ni_{0.17}O_{1.76}$ which is of greater magnitude to that observed in previous examples without a structure transition as shown in FIG. 5B.

Figure 5E:
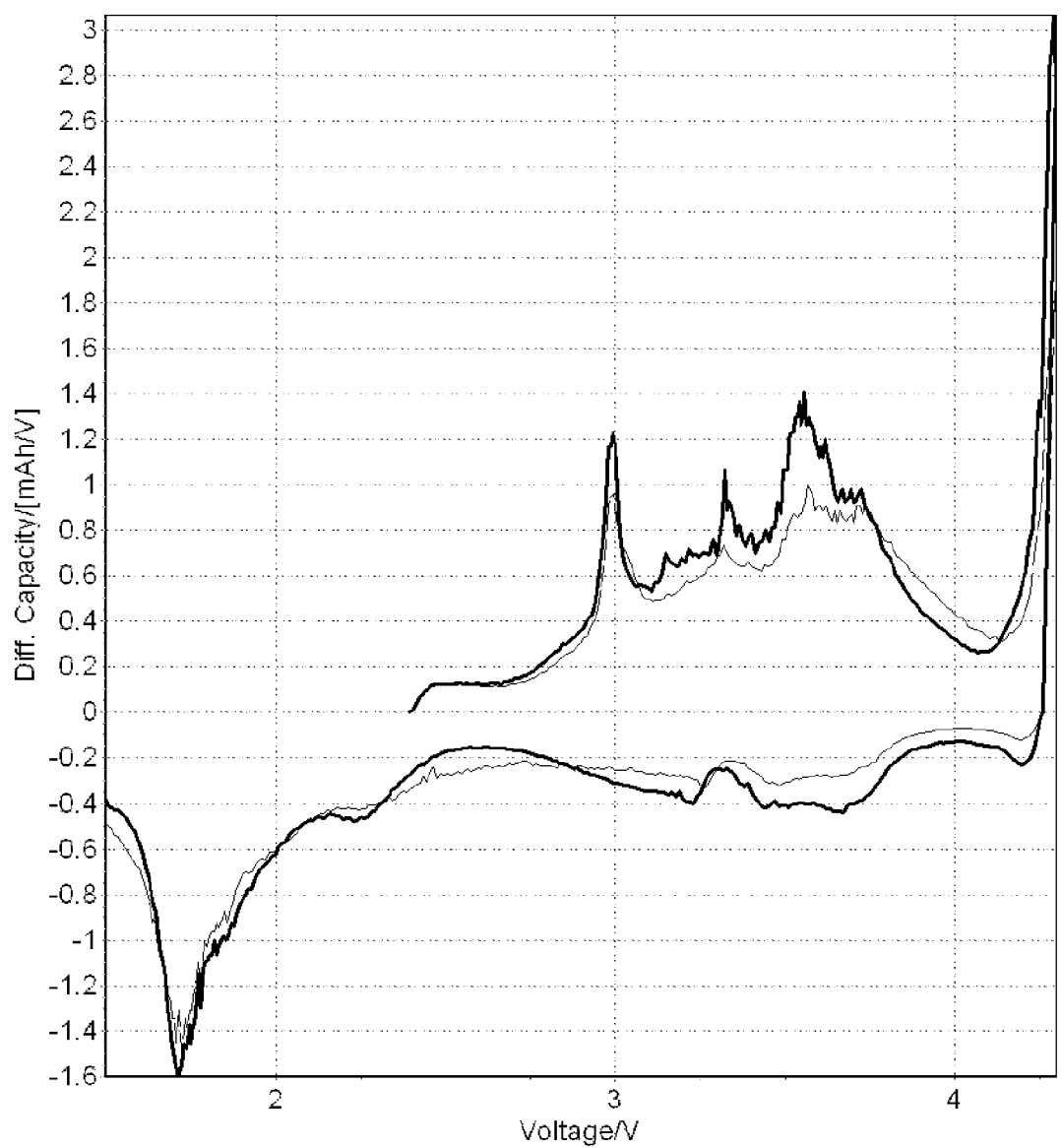
FIG. 5(E) shows the Differential Capacity Profiles for the $1^{st}$ charge cycle (Differential Capacity [mAh/g/V] verses Na-ion half Cell Voltage [V vs Na/Na+]) for the cathode material prepared according to Example 5 heated to a temperature of 900° C. under a constant flow of air (dashed line) or under a constant flow of nitrogen (solid line).

Electrochemically Example 5 shows similar material properties to those observed in the O3 layered oxide materials described in examples 1-4. Again, this material can be clearly differentiated electrochemically from the stoichiometric variant. The first cycle charge-discharge voltage profiles (Na-ion half cell Voltage [V vs Na/Na+] verses Cathode specific capacity [mAh/g]) are shown in FIG. 5 D in which the sample produced by post processing in air and under $N_2$ are compared. It can be seen FIG. 5 D that inducing oxygen deficiency within this material leads to an increase in the cycling capacity 120 mAh/g and 115 mAh/g for the non-stoichiometric and stoichiometric samples. However, the average voltage is reduced by inducing oxygen non stoichiometry in the sample and this reduces from 2.8V vs Na/Na+ to 2.3V vs Na/Na+. Calculation of specific energy density yields 268 and 321 Wh/kg for the sample post processed in nitrogen and air, respectively. This reduction in average voltage may be as a result of the significant proportion of reduced elements present in the material when in its oxygen non-stoichiometric form. The Differential Capacity Profiles for the $1^{st}$ charge cycle (Differential Capacity [mAh/g/V] verses Na-ion half Cell Voltage [V vs Na/Na+]) are shown in FIG. 5E in which it can be seen that there is a contribution to capacity originating from a low voltage reaction in the non-stoichiometric material.

Figure 6A:
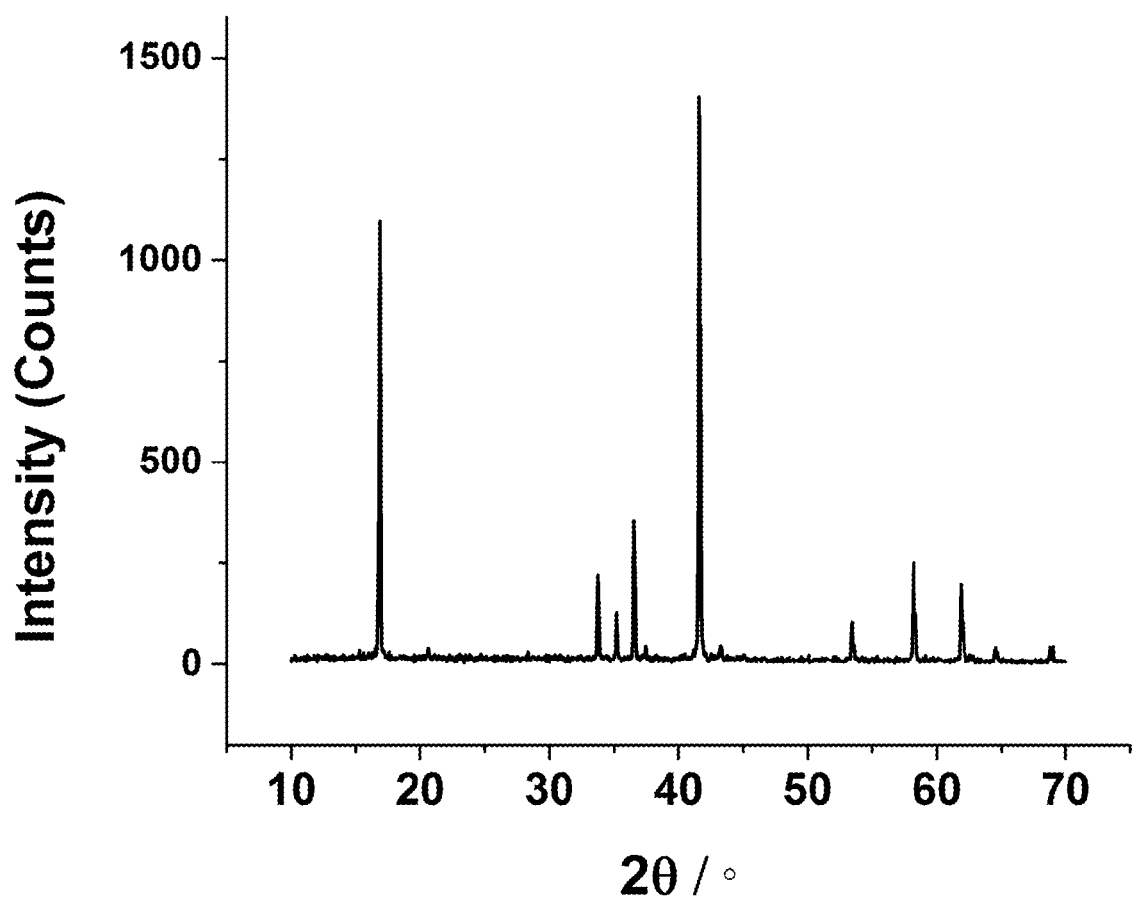
FIG. 6(A) shows Powder X-ray diffraction pattern of $NaFe_{0.5}Ti_{0.125}Mn_{0.125}Mg_{0.25}O_2$ prepared according to Example 5.
Figure 6B:
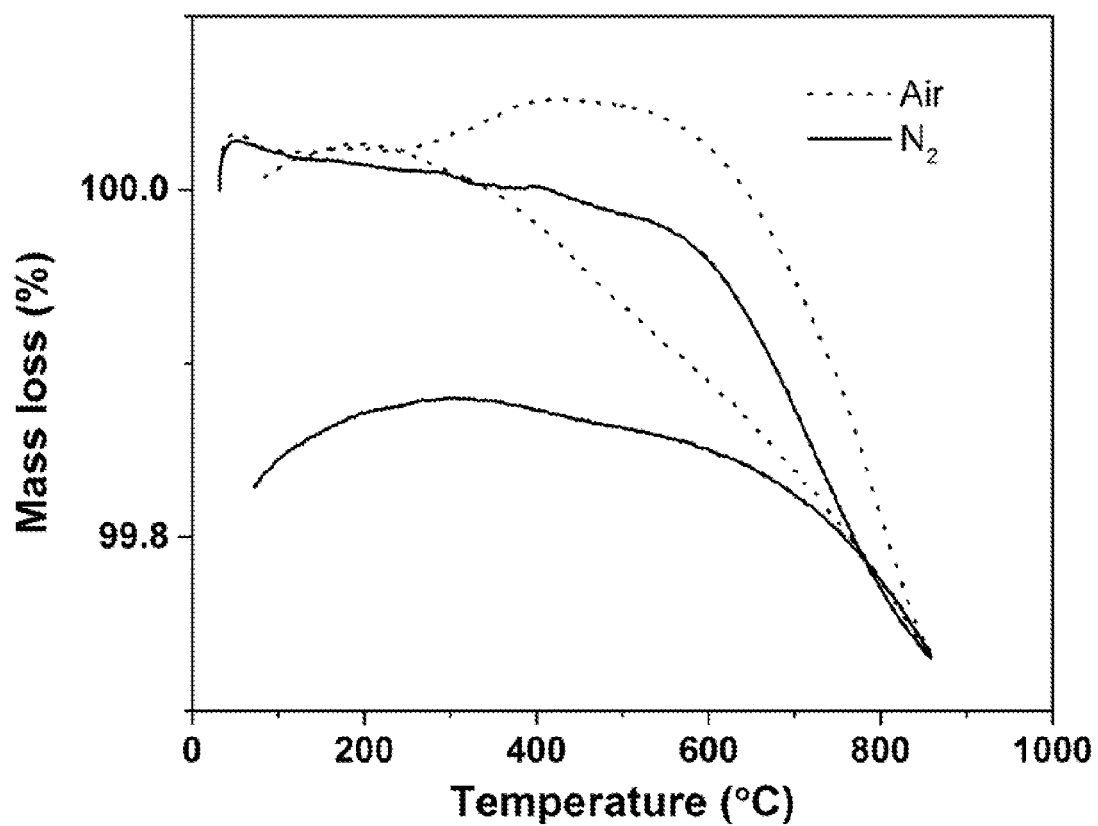
FIG. 6(B) shows the TGA-STA data obtained for $NaFe_{0.5}Ti_{0.125}Mn_{0.125}Mg_{0.25}O_2$ (Example 6) heated to a temperature of 850° C. under a constant flow of air (dashed line) or under a constant flow of nitrogen (solid line).
Figure 6C:
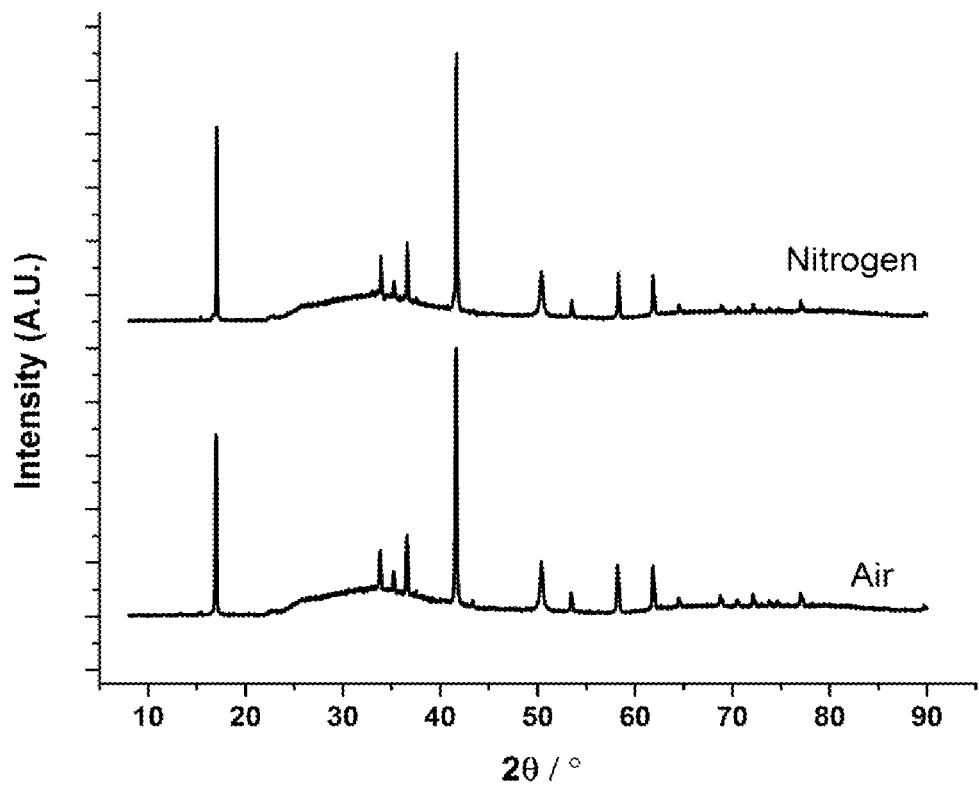
FIG. 6(C) Powder X-ray diffraction patterns of $NaFe_{0.5}Ti_{0.125}Mn_{0.125}Mg_{0.25}O_2$ after being heated to 850° C. and cooled in either air or nitrogen.
Figure 6D:
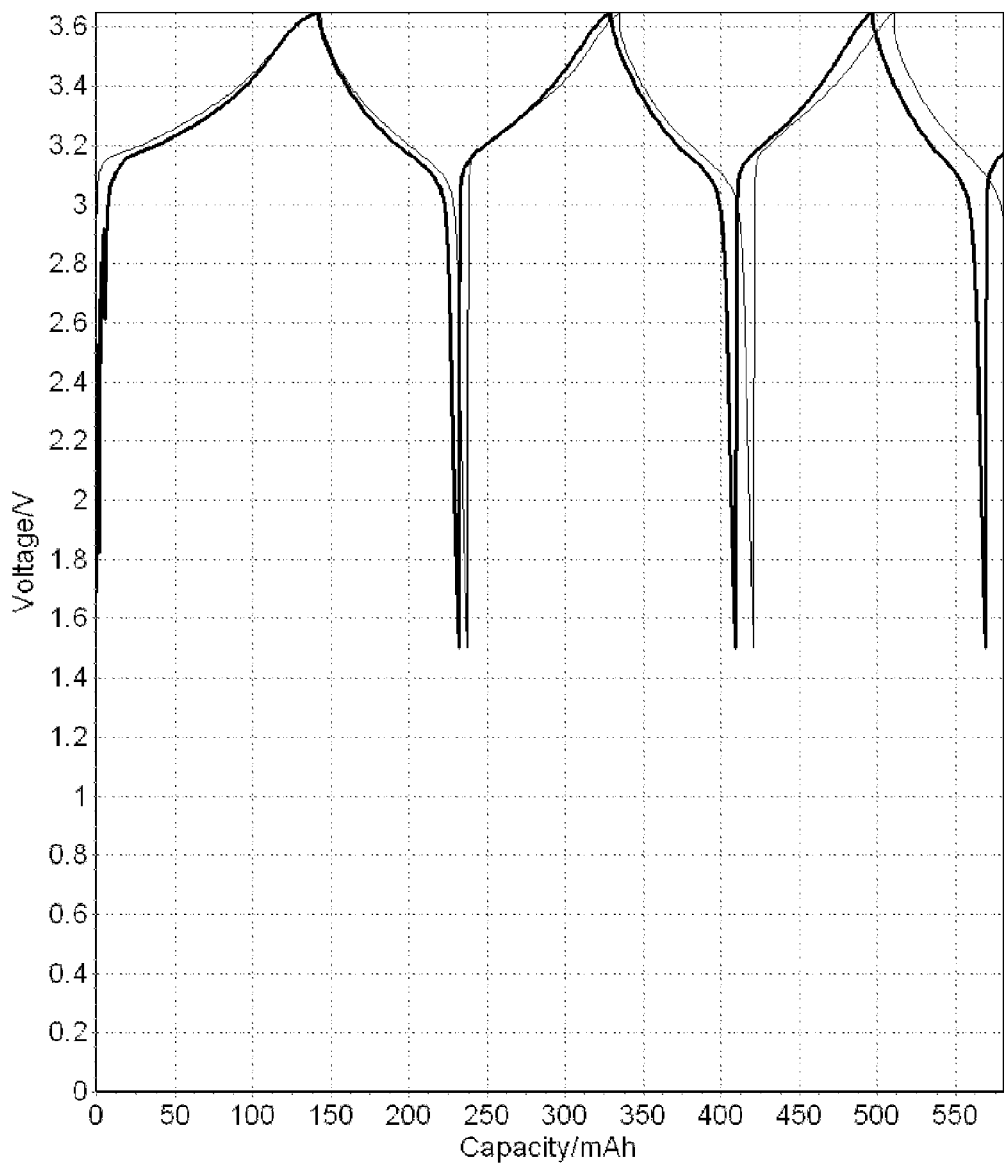
FIG. 6(D) shows the first three charge-discharge voltage profiles (Na-ion half cell Voltage [V vs Na/Na+] verses Cathode specific capacity [mAh/g]) for the cathode material prepared according to Example 6 after heating to 850° C. under a constant flow of air (solid line) or under a constant flow of nitrogen (dashed line).
Figure 6E:
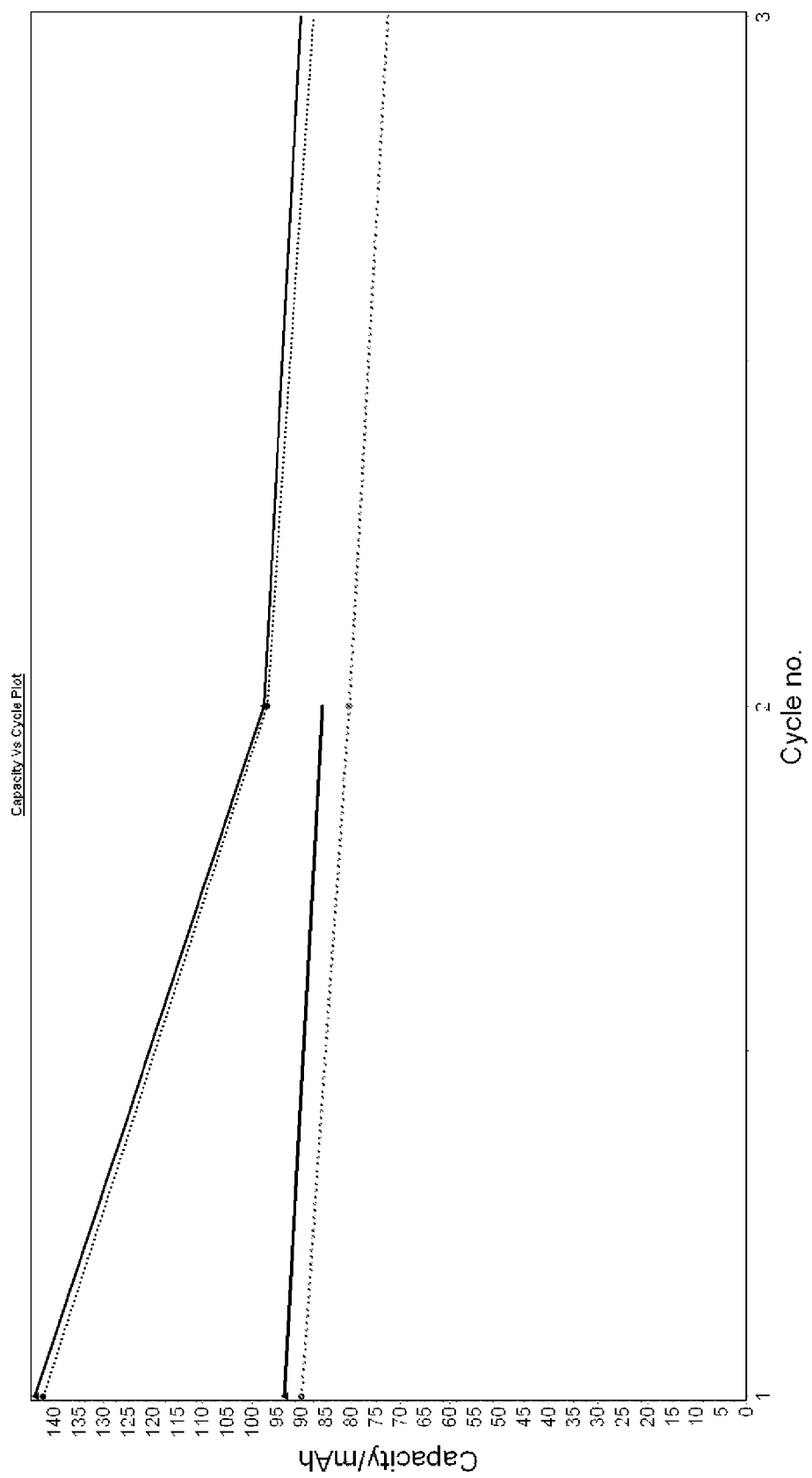
FIG. 6(E) shows the cycle life (Cathode specific capacity [mAh/g] vs cycle number) for the cathode material prepared according to Example 6 after heating to 850° C. under a constant flow of air (circles) or under a constant flow of nitrogen (triangles). Dotted line represents discharge and solid line represents charge.
Figure 6F:
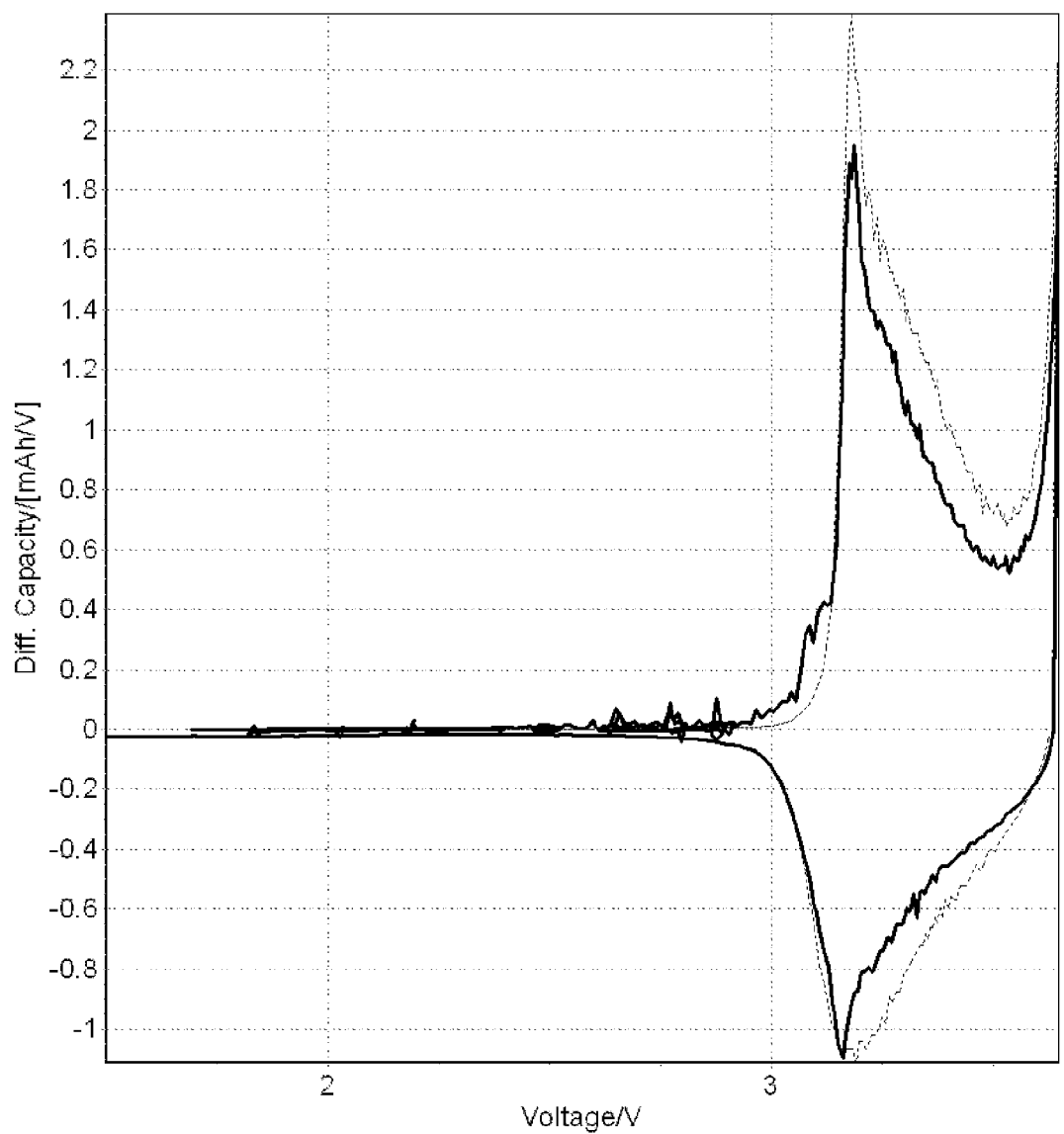
FIG. 6(F) shows the Differential Capacity Profiles for the $1^{st}$ charge cycle (Differential Capacity [mAh/g/V] verses Na-ion half Cell Voltage [V vs Na/Na+]) for the cathode material prepared according to Example 6 heated to a temperature of 800° C. under a constant flow of air (dashed line) or under a constant flow of nitrogen (solid line).

With reference to Example 6, this material is a an example of a layered oxide material which can be stabilized in an oxygen non-stoichiometric form which does not contain redox active +2 oxidation state metals and forms a O3 layered structure. FIG. 6A shows the Powder X-ray diffraction pattern of stoichiometric $Na Fe_{0.5}Ti_{0.125}Mn_{0.125}Mg_{0.25}O_2$ showing the formation of an O3 layered oxide product as described in Table 1. In this material a mass loss of 0.18% was realised when post processed by heating to 900° C. and cooling under $N_2$ this equates to a stoichiometry if the mass loss is associated with oxygen of $Na Fe_{0.5}Ti_{0.125} Mn_{0.125}Mg_{0.25}O_{1.98}$, which is of similar magnitude to that observed in previous Again, Example 6 can be clearly differentiated electrochemically from the stoichiometric variant. The first three cycle charge-discharge voltage profiles (Na-ion half cell Voltage [V vs Na/Na+] verses Cathode specific capacity [mAh/g]) are shown in FIG. 6 D in which the sample produced by post processing in air and under $N_2$ are compared. It can be seen FIG. 6 D that inducing oxygen deficiency within this material leads to an increase in the cycling capacity 95 mAh/g and 90 mAh/g for the non-stoichiometric and stoichiometric samples. However, the average voltage is increased by inducing oxygen non stoichiometry in the sample and this increases from 3.12 to 3.16 V vs Na/Na+. Calculation of specific energy density yields 300 and 280 Wh/kg for the sample post processed in nitrogen and air, respectively. FIG. 6E compares the cycling capacities and capacity retention of the materials produced from Example 6 in which it can be seen that the oxygen non-stoichiometric form shows higher capacity retention over the first few electrochemical cycles. The Differential Capacity Profiles for the $1^{st}$ charge cycle (Differential Capacity [mAh/g/V] verses Na-ion half Cell Voltage [V vs Na/Na+]) are shown in FIG. 6F in which it can be seen that both the stoichiometric and non-stoichiometric forms of this oxide show similar irreversibility on the first electrochemical cycle.

Further to the embodiments of the invention described by Examples 1-6. Oxygen non-stoichiometry can be induced in materials by altering the atmosphere under which the reaction product quench to room temperature. Examples of this embodiment of the invention are described in Table 1 by the materials of Examples 7-11. These materials are produced by the "single step process" outlined above, in which the precursor materials are mixed and heated in air for the time period specified in Table 1. The atmosphere is then changed to an inert atmosphere as specified in Table 1 and the material is allowed to cool under the inert atmosphere, resulting in an oxygen deficient material.

INDUSTRIAL APPLICABILITY

Electrodes according to the present invention are suitable for use in many different applications, energy storage devices, rechargeable batteries, electrochemical devices and electrochromic devices. Advantageously the electrodes according to the invention are used in conjunction with a counter electrode and one or more electrolyte materials. The electrolyte materials may be any conventional or known materials and may comprise of either aqueous electrolyte or non-aqueous electrolytes or a mixture thereof.

The invention claimed is:

1. A composition having the formula $$A_x M_y M^i{}_{zi} O_{2-d},$$

where

A is sodium or a mixed alkali metal including sodium as a major constituent;

$0.5 \leq x \leq 0.76$;

M is nickel;

$y > 0$;

$M^i{}_{zi}$, for $i=1, 2, 3 \ldots n$ is $M^1{}_{z1} M^2{}_{z2} M^3{}_{z3} \ldots M^n{}_{zn}$, and wherein each of $M^1{}_{z1} M^2{}_{z2} M^3{}_{z3} \ldots M^n{}_{zn}$ is a metal or germanium;

$z1 > 0$ $zi \geq 0$ for each $i=2, 3 \ldots n$;

$0 < d \leq 0.5$;

the values of x, y, zi for $i=1, 2, 3 \ldots n$, and d are such as to maintain charge neutrality; and the values of y, zi for $i=1, 2, 3 \ldots n$, and d are such that $y + \Sigma zi > \frac{1}{2}(2-d)$.

2. A composition as claimed in claim 1 in which $M^i$, for $i=1, 2, 3 \ldots n$, is a transition metal, an alkali metal or an alkaline earth metal.

3. A composition as claimed in claim 1 wherein $M^i$, for $i=1, 2, 3 \ldots n$, is selected from the group consisting of: nickel, iron, cobalt, manganese, titanium, aluminium, magnesium and zirconium.

4. A composition as claimed in claim 1 in which $0.5 \leq x \leq 0.67$.

5. A composition as claimed in claim 1 in which $0.67 \leq x \leq 0.76$.

6. A composition having the formula $$A_x M_y M^1{}_{zi} M^i{}_{zi} O_{2-d},$$

where

A is sodium or a mixed alkali metal including sodium as a major constituent;

$0.76 \leq x \leq 1.3$;

M is a nickel;

$y > 0$;

$M^1$ is an alkali metal or a mixed alkali metal;

$z1 > 0$;

$M^i{}_{zi}$, for $i=2, 3, 4 \ldots n$ is $M^2{}_{z2} M^3{}_{z3} M^4{}_{z4} \ldots M^n{}_{zn}$, wherein $M^2{}_{z2}$ is a transition metal and each of $M^2{}_{z2} M^3{}_{z3} M^4{}_{z3} \ldots M^n{}_{zn}$, is a metal or germanium;

$z2 > 0$;

$zi \geq 0$ for each $i=3, 4 \ldots n$;

$0 < d \leq 0.5$;

the values of x, y, z1, zi for $i=2, 3, 4 \ldots n$, and d are such as to maintain charge neutrality;

the values of y, z1, zi, for $i=2, 3, 4 \ldots n$, and d are such that $y + \Sigma z1 + \Sigma zi > \frac{1}{2}(2-d)$; and the composition adopts a layered oxide structure in which the alkali metal atoms A are coordinated by oxygen in a prismatic or octahedral environment, and in which the alkali metal atoms $M^1$ adopts a coordination complementary to that adopted by the other $M^i$ transition metal element(s).

7. A composition as claimed in claim 6 in which $M^i$, for $i=3, 4 \ldots n$, is a transition metal, an alkali metal or an alkaline earth metal.

8. A composition as claimed in claim 6 wherein $M^1$ is selected from the group consisting of: sodium, lithium, and a mixture of sodium and lithium.

9. A composition as claimed in claim 6 wherein $M^i$, for $i=2, 3 \ldots n$, is selected from the group consisting of: nickel, iron, cobalt, manganese, titanium, aluminium, magnesium and zirconium.

10. A composition as claimed in claim 6 in which $0.9 \leq x$.

11. A composition as claimed in claim 6 in which $x \leq 1.3$.

12. A composition as claimed in claim 6 in which $z2 \leq 0.3$.

13. A composition having the formula $$A_x M_y M^i{}_{zi} O_{2-d},$$

where

A is sodium or a mixed alkali metal including sodium as a major constituent;

$0.5 \leq x \leq 1$;

M is a transition metal not including nickel;

$y > 0$;

$M^i{}_{zi}$, for $i=1, 2, 3 \ldots n$ is $M^1{}_{z1} M^2{}_{z2} M^3{}_{z3} \ldots M^n{}_{zn}$, and wherein each of $M^1{}_{z1} M^2{}_{z2} M^3{}_{z3} \ldots M^n{}_{zn}$ is germanium or a metal not including nickel;

$zi \geq 0$ for each $i=1, 2, 3 \ldots n$;

$0 < d \leq 0.5$;

the values of x, y, zi for $i=1, 2, 3 \ldots n$, and d are such as to maintain charge neutrality; and the values of y, zi for $i=1, 2, 3 \ldots n$, and d are such that $y + \Sigma zi > \frac{1}{2}(2-d)$.

14. A composition as claimed in claim 13 wherein $M^i$, for $i=1, 2, 3 \ldots n$, is selected from the group consisting of: nickel, iron, cobalt, manganese, titanium, aluminium, magnesium, calcium and zirconium.

15. A composition as claimed in claim 1 in which A is a mixed alkali metal including sodium and lithium.

16. A composition as claimed in claim 6 in which A is a mixed alkali metal including sodium and lithium.

17. A composition as claimed in claim 13 in which A is a mixed alkali metal including sodium and lithium.

18. A composition as claimed in claim 1 in which A is sodium.

19. A composition as claimed in claim 6 in which A is sodium.

20. A composition as claimed in claim 13 in which A is sodium.

* * * * *